(12) United States Patent
Grace

(10) Patent No.: US 8,769,423 B2
(45) Date of Patent: Jul. 1, 2014

(54) CONTENT DISTRIBUTION SYSTEMS AND METHODS USING DIGITAL IMAGES

(75) Inventor: Mark Grace, Alpharetta, GA (US)

(73) Assignee: Beyondvia Technologies, Atlanta, GA (US)

( * ) Notice: Subject to any disclaimer, the term of this patent is extended or adjusted under 35 U.S.C. 154(b) by 190 days.

(21) Appl. No.: 13/365,477

(22) Filed: Feb. 3, 2012

(65) Prior Publication Data

US 2012/0137229 A1 May 31, 2012

Related U.S. Application Data

(63) Continuation-in-part of application No. 12/976,345, filed on Dec. 22, 2010, which is a continuation-in-part of application No. 12/112,842, filed on Apr. 30, 2008, now Pat. No. 8,074,176.

(51) Int. Cl.
*G06F 3/00* (2006.01)
*G06F 3/048* (2013.01)

(52) U.S. Cl.
USPC ............................ 715/758; 715/752; 715/847

(58) Field of Classification Search
CPC ............ G06F 17/248; G06F 17/30873; G06Q 10/107
USPC .......................................... 715/752, 758, 847
See application file for complete search history.

(56) References Cited

U.S. PATENT DOCUMENTS

| | | | |
|---|---|---|---|
| 6,141,003 A | 10/2000 | Chor et al. | |
| 6,505,212 B2 | 1/2003 | Nakano et al. | |
| 6,941,294 B2 | 9/2005 | Flank | |
| 7,012,963 B2 | 3/2006 | Zdepski et al. | |
| 7,082,573 B2 | 7/2006 | Apparao et al. | |
| 7,092,969 B2 | 8/2006 | Meek et al. | |
| 7,177,879 B2 | 2/2007 | Flank et al. | |
| 7,403,657 B2 | 7/2008 | Nagasaka et al. | |
| 7,421,470 B2 | 9/2008 | Ludwig et al. | |
| 7,421,660 B2 | 9/2008 | Charnock et al. | |
| 7,421,690 B2 | 9/2008 | Forstall et al. | |
| 7,424,150 B2 | 9/2008 | Cooper et al. | |
| 7,424,671 B2 | 9/2008 | Elza et al. | |
| 7,424,673 B2 | 9/2008 | Broman et al. | |
| 7,493,640 B1 | 2/2009 | Derrenberger et al. | |
| 8,290,206 B1 * | 10/2012 | Meyers ......................... | 382/100 |
| 2002/0120701 A1 | 8/2002 | Ohba | |
| 2003/0069801 A1 | 4/2003 | Che-Mponda et al. | |
| 2003/0110517 A1 | 6/2003 | Lee | |
| 2004/0148573 A1 | 7/2004 | Buice et al. | |
| 2005/0027802 A1 | 2/2005 | Madsen et al. | |
| 2005/0193425 A1 | 9/2005 | Sull et al. | |
| 2007/0121146 A1 | 5/2007 | Nesbit et al. | |
| 2007/0174425 A1 | 7/2007 | Gousse et al. | |

(Continued)

*Primary Examiner* — Andrea Long

(74) *Attorney, Agent, or Firm* — Clements Bernard PLLC; Lawrence A. Baratta, Jr.; Christopher L. Bernard

(57) ABSTRACT

A content distribution system includes a host server communicatively coupled to at least one data store, at least one user, and a network communicatively coupling the at least one user to the host server and the content. The host server includes instructions executable by a processor therein, and in response to such execution causes the host server to: provide sequence of digital images to the at least one user, wherein each of the digital images indicative of content in the at least one data store, and responsive to a selection of one of the digital images, distribute the content to the at least one user.

15 Claims, 34 Drawing Sheets

(56) References Cited

U.S. PATENT DOCUMENTS

| | | |
|---|---|---|
| 2007/0195338 A1 | 8/2007 | Brownstein |
| 2008/0007625 A1 | 1/2008 | Reid et al. |
| 2008/0060032 A1 | 3/2008 | Toutenhoofd |
| 2008/0071895 A1 | 3/2008 | Johnson et al. |
| 2008/0075395 A1 | 3/2008 | Wallace et al. |
| 2008/0216022 A1 | 9/2008 | Lorch et al. |
| 2009/0178079 A1 | 7/2009 | Derrenberger et al. |

* cited by examiner

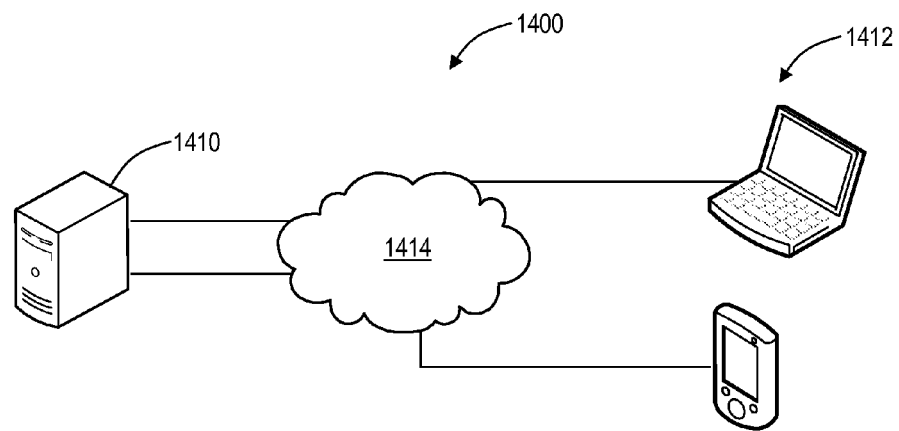
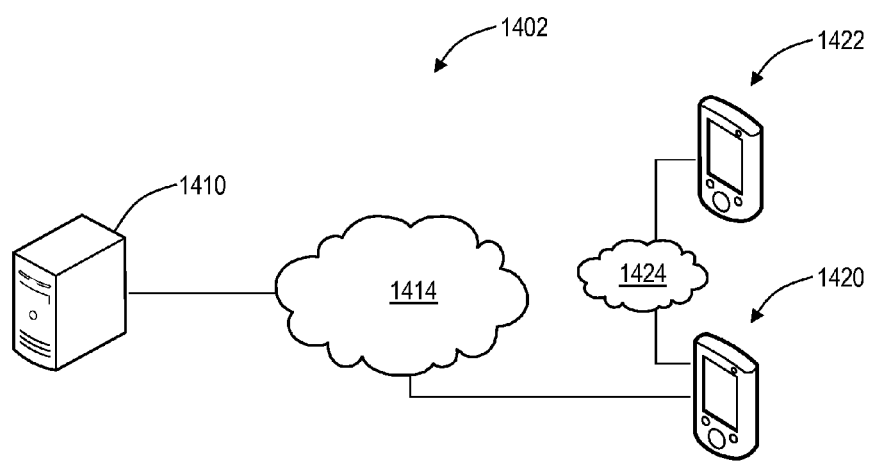
*FIG. 12*

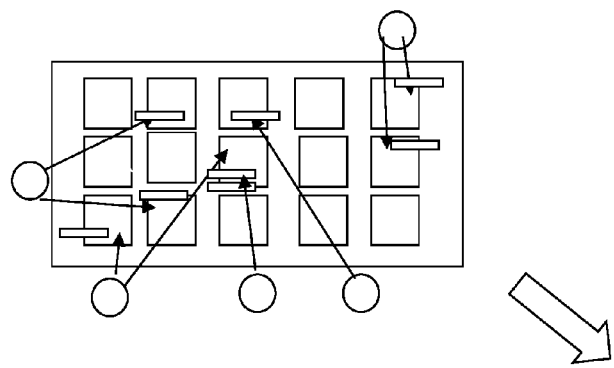
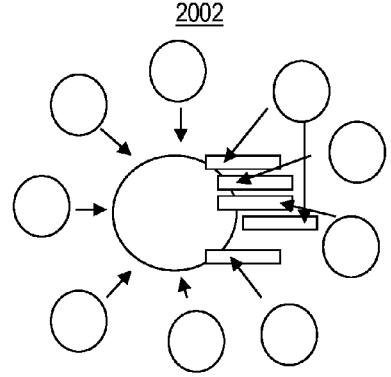
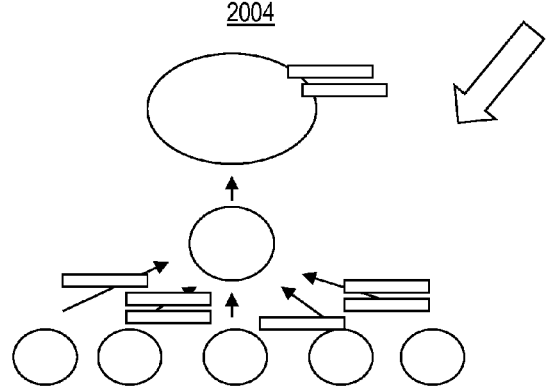
FIG. 22

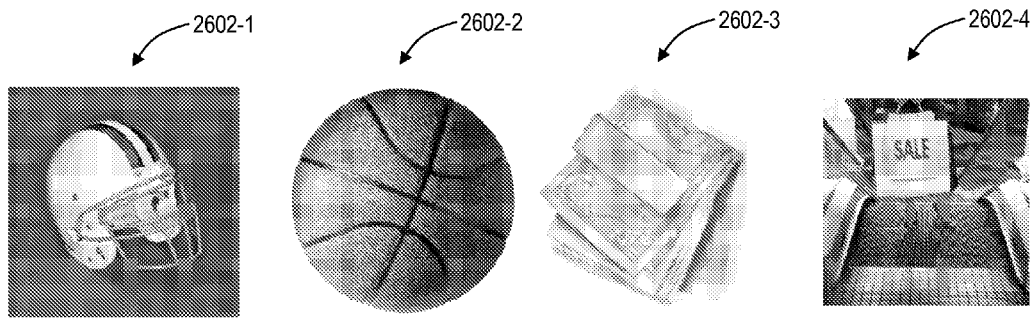
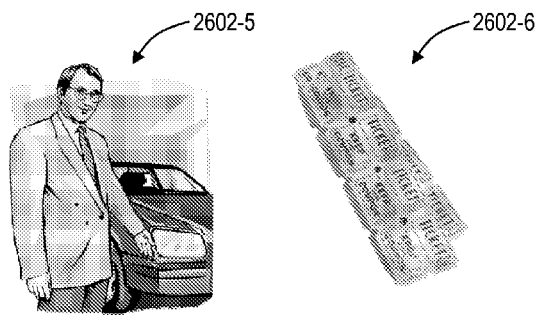
FIG. 31

CONTENT DISTRIBUTION SYSTEMS AND METHODS USING DIGITAL IMAGES

CROSS-REFERENCE TO RELATED APPLICATION(S)

The present patent application is a continuation-in-part of U.S. patent application Ser. No. 12/976,345 filed Dec. 22, 2010 and entitled "MOBILE ELECTRONIC COMMUNICATIONS DIALOG USING SEQUENCED DIGITAL IMAGES" which is a continuation-in-part of U.S. patent application Ser. No. 12/112,842 filed Apr. 30, 2008 (now U.S. Pat. No. 8,074,176) and entitled "ELECTRONIC COMMUNICATIONS DIALOG USING SEQUENCED DIGITAL IMAGES STORED IN AN IMAGE DICTIONARY," the contents of each is incorporated by reference in-full herein.

FIELD OF THE INVENTION

The present disclosure relates generally to electronic communications. More particularly, the present disclosure relates to content distribution systems and methods between users via sequences of digital images.

BACKGROUND OF THE INVENTION

The ability for individuals and groups to communicate and carry on a conversation has been dramatically transformed by personal computing/memory devices, easy to use software, and the Internet. For example, consumer communications have evolved over the past twenty years from almost solely using land-based home phone lines for verbal communications and discussions to mobile phone devices which enable both verbal communications and the use of written words as messages in the form of text messages or electronic mail. In this interconnected Internet world, verbal communication is taking a back seat to software that manipulates words enabling text and email messaging. In this new abbreviated-text, quick-phrase Internet world, meaning can be lost, or the electronic message can be easily misinterpreted.

Since the evolution of written communications, natural language words have dominated communication and dialogue, while descriptive pictures have been used to provide ad hoc insertions to words and stories. Even in the current electronic digital age of the Internet, natural language words dominate dialogue, as witnessed by the almost universal use of email and the more recent explosion of text messaging on computers and cell phones.

The continued investment in (1) advanced computer processor and memory technology with the vast manipulation capabilities they provide, and (2) the electronic communication networks that carry the message from one computer, personal digital assistant (PDA), cell phone, or other electronic device to another computer, PDA, cell phone, or other electronic device is the modern day equivalent to investment in the word printing press. More and more efficient natural language word communication is happening at electron speed to instantly connect one user to another user almost anywhere in the world. Yet, the understandable meaning being conveyed may be confused, as words do not always carry enough information for full meaning. For example, when a user texts "Bring home an apple for me," it is not all that clear what type of apple that the user wants: red/green, small/large, juicy/dry, sweet/sour, etc, so the apple that the user gets may not be the one that the user wanted.

Current word based communication systems operate on a built in conversation control principle of "I talk, you listen, then respond", where a leader starts the conversation (because in speaking only one can talk and everyone else listens) and waits for a response from the listener or audience, and the leader receives feedback and responds, thus continuing the cycle of "I talk, you listen" on and on (or called "post and wait" method in word emails, chats or blogs). Computer email and text messaging systems mimic this approach as they developed from a vocal speech paradigm and imitated how we speak in real life. So, email and text messaging communication systems tend to list initiator-then responses-then initiator response—and so on. Further, once a word sentence is constructed and used (stated), there is little need to save the word sentence and reuse it in another word sentence or word paragraph as is, so the word sentences are used in the one flow they were first, and only designed for. The conversation control paradigm of "I talk, you listen" does not apply to conversations using images sequenced together to send message(s) amongst many (tens to millions) participants simultaneously in real time. Each participant uses their own images and image sentences to communicate at any time in the conversation. New, flexible communication rules (styles) are required to manage the new visual talking not bounded by the conventional paradigm of "I talk, you listen" control. It is desirable to provide a system and method that allows for the selection of a communication style for visual sentences from a palette of styles, for the sequencing of these styles in a desired conversation flow in a community, and for the selection of members in the community, and for the members to participate in the discussions using the various styles.

With respect to content distribution, conventional content distribution systems and methods require selecting on line content (e.g., television, movies, music, videos, etc.) in a tedious manner where individual pieces of content are seen one at a time (as opposed to all in relation to each other) or some limited set to view, with no interaction (i.e., ability to select, edit and redirect, etc.) and only a limited way to view (with limited action). Further, users can create activities and license associated content only for short times, because online communities are like "soaps bubbles", where they rise up and grow, and then pop and disappear, so the selection system must be bigger and more lasting than soap bubbles.

BRIEF SUMMARY OF THE INVENTION

In an exemplary embodiment, a content distribution system includes a host server communicatively coupled to at least one data store, at least one user, and a network communicatively coupling the at least one user to the host server and the content. The host server includes instructions executable by a processor therein, and in response to such execution causes the host server to provide sequence of digital images to the at least one user, wherein each of the digital images indicative of content in the at least one data store, and responsive to a selection of one of the digital images, distribute the content to the at least one user. In another exemplary embodiment, a host server in a content distribution network includes a data store storing a plurality of words and corresponding images in a local visual dictionary, a network interface communicatively coupling the host server to a network, a processor communicatively coupled to the data store and the network interface, and instructions executable by the processor, and in response to such execution causes the processor to provide sequence of digital images to at least one user, wherein each of the digital images indicative of content, and, responsive to a selection of one of the digital images, distribute the content to the at least one user. In yet another exemplary embodiment, a content distribution method includes communicating content to at least one user over a content distribution network; including sequenced images in the content, wherein each of the sequenced images have a direct correspondence with a plurality of words previously associated with each of the sequenced images such that each of the sequenced images is configured to convey a message represented by the plurality of words to the at least one user; and enabling distribution of the content responsive to the at least one user's interaction with the sequenced images.

BRIEF DESCRIPTION OF THE DRAWINGS

The present disclosure is illustrated and described herein with reference to the various drawings, in which like reference numbers denote like method steps and/or system components, respectively, and in which:

FIG. 12 illustrates exemplary operational scenarios of the present disclosure including a web portal-based scenario and an application-based scenario.

FIG. 22 illustrates an exemplary embodiment of selection of several forum styles ordered in a sequence to facilitate individual discussions on a wide range of topics.

FIG. 31 illustrates exemplary images for display on the user interface and the display screens in the content distribution network.

DETAILED DESCRIPTION OF THE INVENTION

Figure 1A:
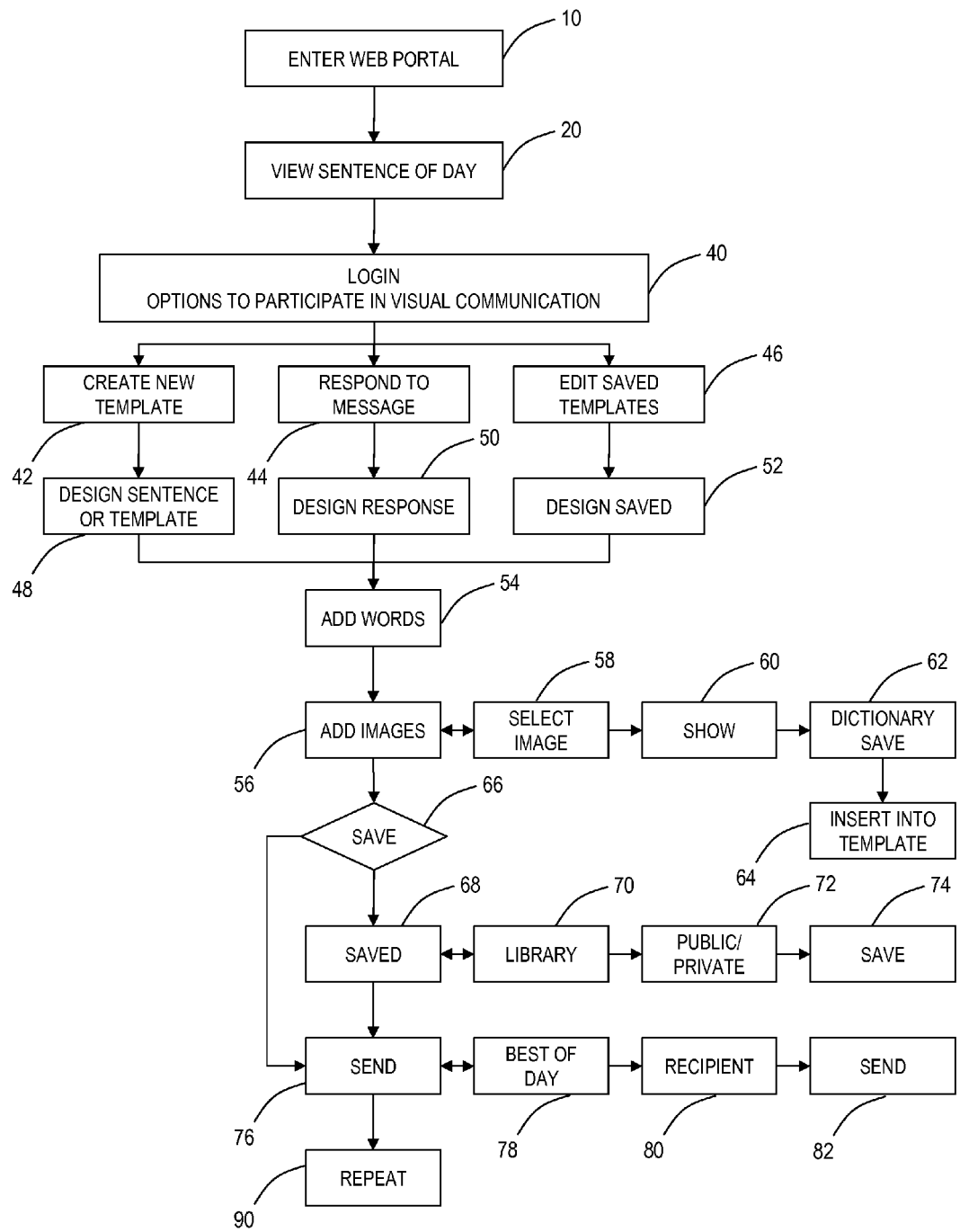
FIG. 1A illustrates an overview of the processing logic to create, save, and send sentences and templates in accordance with an exemplary embodiment of the present disclosure.

Given the rapid increase in memory capacity of computers and networks, current image/picture practice focuses entirely on manipulating images for the passive purpose of image presentation and broadcasting, and has not been used heretofore for structuring a continuing communication dialogue, with connections to a responding community of people or a lasting relevant image and word dictionary. Current software programs having varying levels of ability to name images, search images, manipulate images as for adding to and changing the image, and rank images. Certain Internet web sites allow for the collection of images produced from various sources (e.g., digital cameras) for the purposes of storage and simple display or even printing. As with the printing press, these image storage systems are similar to individual letters in the printing press drawer waiting to be assembled into a template for distribution to the community. And once distributed to the community, the community can respond in kind and carry the discussion forward, saving any components of the discussion they may like, in any form, such as a paragraph, a book, workflow, a manual.

The current natural language word system of dialogue could be enhanced to deliver clearer meaning by a system and method that adds pictures as a fundamental component to the sentence dialogue structure (and other structure templates that can be used to communicate), e.g., inserting the picture of a green, small, granny smith apple enhances the apple text message and better ensures that the user gets the right apple. Therefore, it is desirable to build a communication system and method that uses pictures as the primary mode of dialogue (and words for enhancement).

Embodiments of the present disclosure provide a system and method for electronic communications dialogue between and among a plurality of users. Embodiments include building image dictionaries defined by words, sequencing the images and associated words into certain communication templates, and publishing the templates to select individuals and communities or groups for response and discussion. To initiate a conversation, a user first selects a preferred communication template and inserts sample words, then sample images are selected from a visual dictionary and inserted into the appropriate location in the template until the template is completed. The user selects the method of sending the template, identifies the recipients, and presses send on a user interface. The user may perform this functionality through a web portal, an application operating on a mobile device or the like, etc. As described herein, a portal may include one or more servers, the "cloud", a wireless provider, or the like. Specifically, portal may refer to any device communicatively coupled to a network such as the Internet that is configured to provide the functionality described herein.

In an exemplary embodiment, a visual dictionary is created for each user using a facility which takes images from any electronic source (e.g., photos, websites, drawings), makes a simple image, and allows users to apply naming tags to store the image for later retrieval. A visual library is created for each user to save completed and partially completed templates (e.g., visual sentences, paragraphs, etc.) to retrieve them for further editing or use. In one exemplary embodiment, the visual dictionary is stored at the web portal. In another exemplary embodiment, the visual dictionary is contained in memory, data storage, etc. associated with a mobile device. Here, the visual dictionary may synchronize or update through the web portal.

The Overall Integrated System

FIG. 1A illustrates an overview of exemplary processing logic to create, save, and send sentences and templates. This exemplary processing logic shows the major activities of sentence/template creation, saving, and sending. Embodiments are directed to a portal system that allows the user to enter the web portal (block 10) and view an example "sentence of the day" (block 20). If the user wants to create his own dialogue, he can log in, and have a number of options to participate in a dialogue (block 40). In a first option, the user could create a new sentence or a new template (block 42). In a second option, the user could respond to a message sent to him from another user (block 44). In a third option, the user could go to his saved templates library (block 46), and select an item to edit. In each case, the user selects a message into which images are added according to the template. To input images, the user either extracts images from sources external to the portal or searches for images in the user's stored visual dictionary. Once an image is selected (block 58), the user can store the image in a "visual dictionary" (block 62) by assigning a word or words to the image, and by assigning a unique random number and other tags that the user defines. Once the user saves the image in a personal visual dictionary (block 62), the user then inserts the image into the template (block 64). The user repeats this image insertion method (blocks 56-64) until the template has been completed, and then moves to save the template in the user's library (blocks 68, 70) or goes directly to send the message (block 76). If the user decides to save the message (block 66), the user defines how to save it in his library (block 70), and can decide to save it as private or public for other users to see (block 72). After saving the message (block 74), the user has the option to send it to someone, or to return to the home portal to insert it into a bigger template, via the send option. Using the send option (block 76), the user can decide to submit the message to the "sentence of the day" (block 78). The user then sends the message to selected individuals and/or groups in the portal (blocks 80, 82), and can send an alert to others outside the portal via electronic means like email. After sending the message (block 76), the user returns to the home portal and can repeat the process (block 90). In an exemplary embodiment, the alert may also be a full visual message, such as with using an app on a mobile device.

Figure 10:
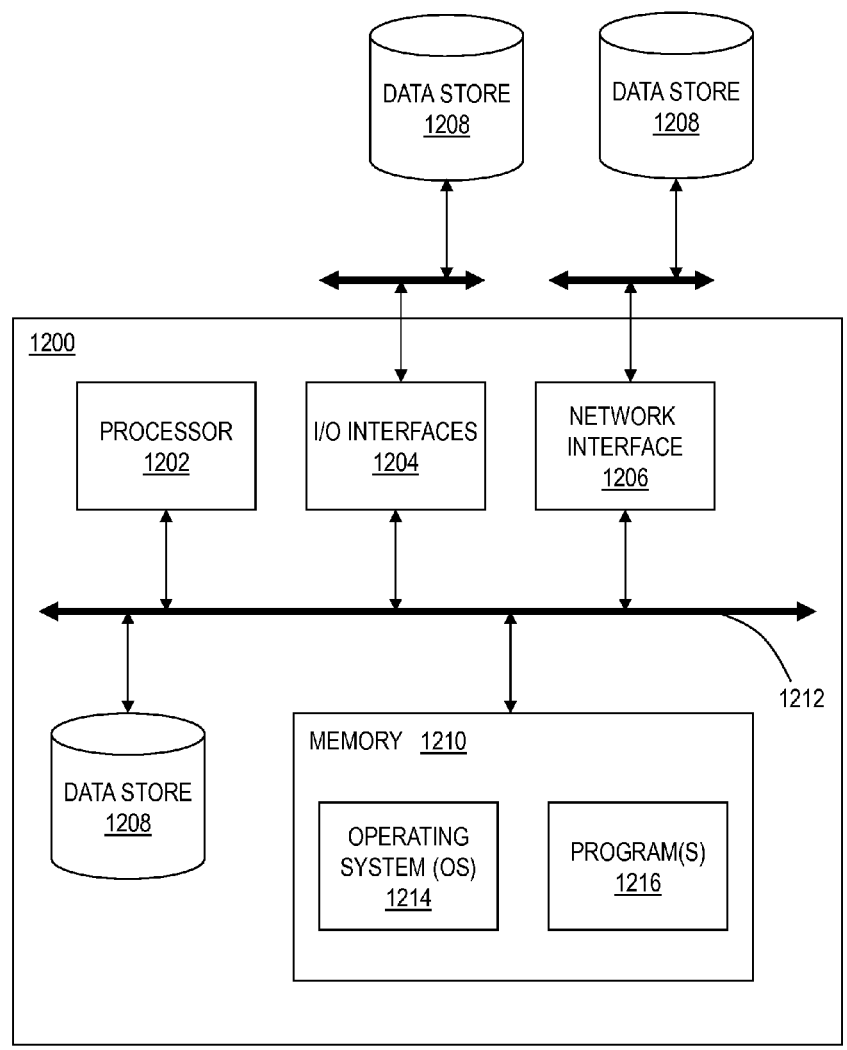
FIG. 10 illustrates an exemplary block diagram of a server which may be utilized in an exemplary implementation of a web portal.

The web portal for electronic communications dialog between a plurality of users using digital images can be accessed via any computing device having a networking capability including, but not limited to, mainframe computers, portable computers, workstations, personal digital assistants, cell phones, and other mobile computing devices. Furthermore, the web portal may be realized in a server, such as depicted in FIG. 10. Those of ordinary skill in the art will appreciate that the present disclosure may also be implemented as an application on a device, e.g. mobile phone, smart phone, computer, etc. Here, the web portal functionality described herein may be performed locally at the device via the application.

Figure 1B:
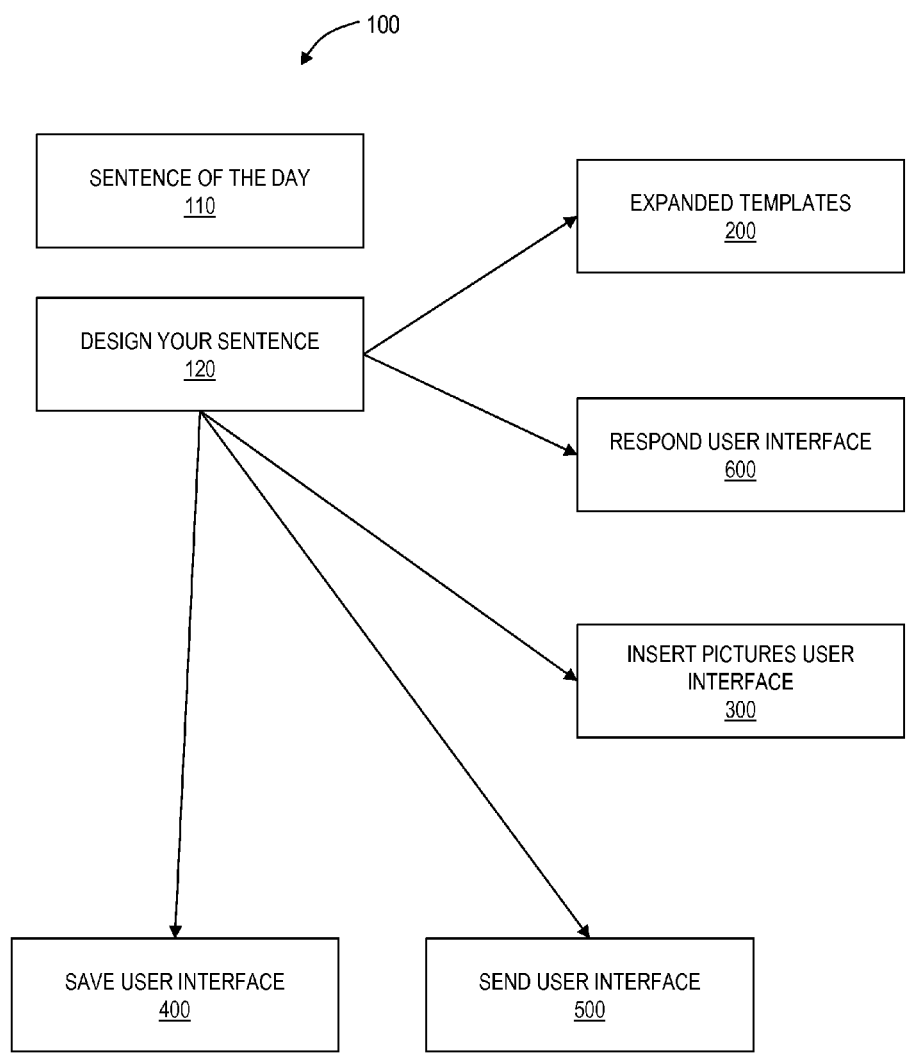
FIG. 1B illustrates an overview of the flow between user interface displays in accordance with an exemplary embodiment of the present disclosure.

FIG. 1B illustrates an overview of the flow between major user interface displays. The various templates including sentences, paragraphs, books, etc. that are used in exemplary embodiments of the disclosure are described more fully below. User interface 100 enables the new user to view pictoral sentences in section 110 as examples to familiarize the new user with preparing pictoral sentences, or other templates, from scratch, and allows the experienced user ("visual talker") to access any template (200) from section 120, or to respond to recently received dialogue via respond user interface (600). If the user wants to create a new simple sentence of six words or less, the user can use the simple "design your sentence" template (120). To input pictures into the simple "design your sentence" template, the user selects a picture via insert pictures user interface (300) from an external source or from the user's own visual dictionary and then submits the picture to be inserted into the sentence (120). Each picture submitted to template (120) has the option to add descriptive words such that when all the words are combined, they create a simple sentence (or another template). Once the simple sentence is fully completed with pictures and words, the user can save the work via save user interface (400). After saving the work in a visual library using save user interface (400), the user can send the work to be communicated to another user by selecting various sending methods and user types available via send user interface (500).

Similar to a new simple sentence described above, a user can create any pictoral communication using any number of templates available in expanded templates (200).

The user can select either to use a respond user interface (600) sending the user to view and highlight messages to respond to, or to view more templates and select which template to use. Once the template is selected, the user inserts pictures via insert pictures user interface (300), saves the completed template via save user interface (400), and sends the template using send user interface (500) similar to the method for a simple sentence.

Accessing the System

Figure 2:
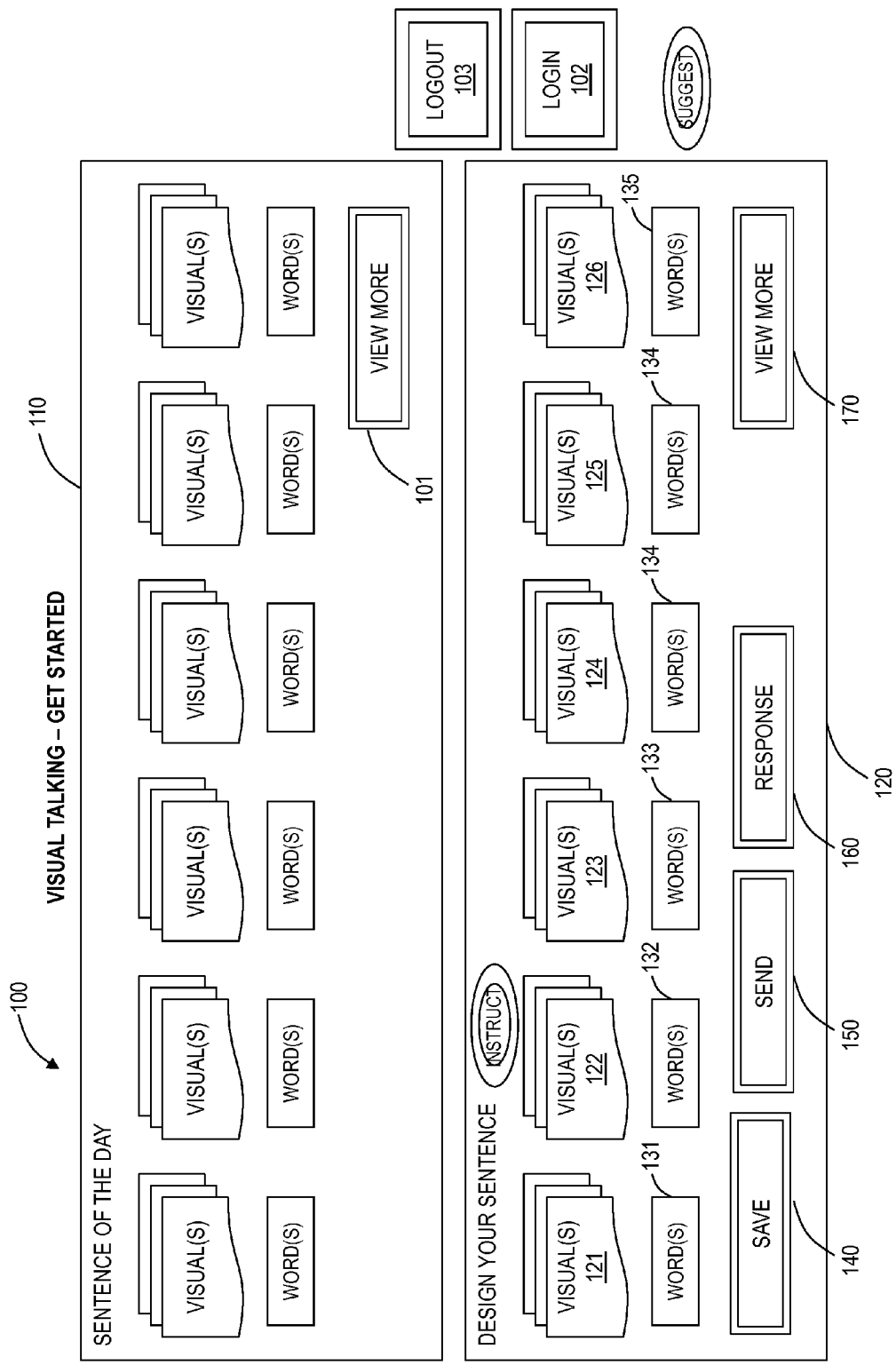
FIG. 2 illustrates an exemplary home portal screen to view a "sentence of the day" and to initiate a user "sentence."

With reference to FIG. 2, the home portal page (100) can be found by the user by typing in the URL of the service provider's website. Once at the home page, the user can view the entire page including sections 110 and 120. Without logging in, the user can view all the examples simply by accessing the list of examples in "View More" (101). A user may login, by pressing the login button (102). If the user presses any other button (121-126, 140, 150, 160, or 170), the user will be prompted automatically to login. Once login occurs, the user has access to all buttons on the user interface 100.

Selecting a New Template

Figure 3:
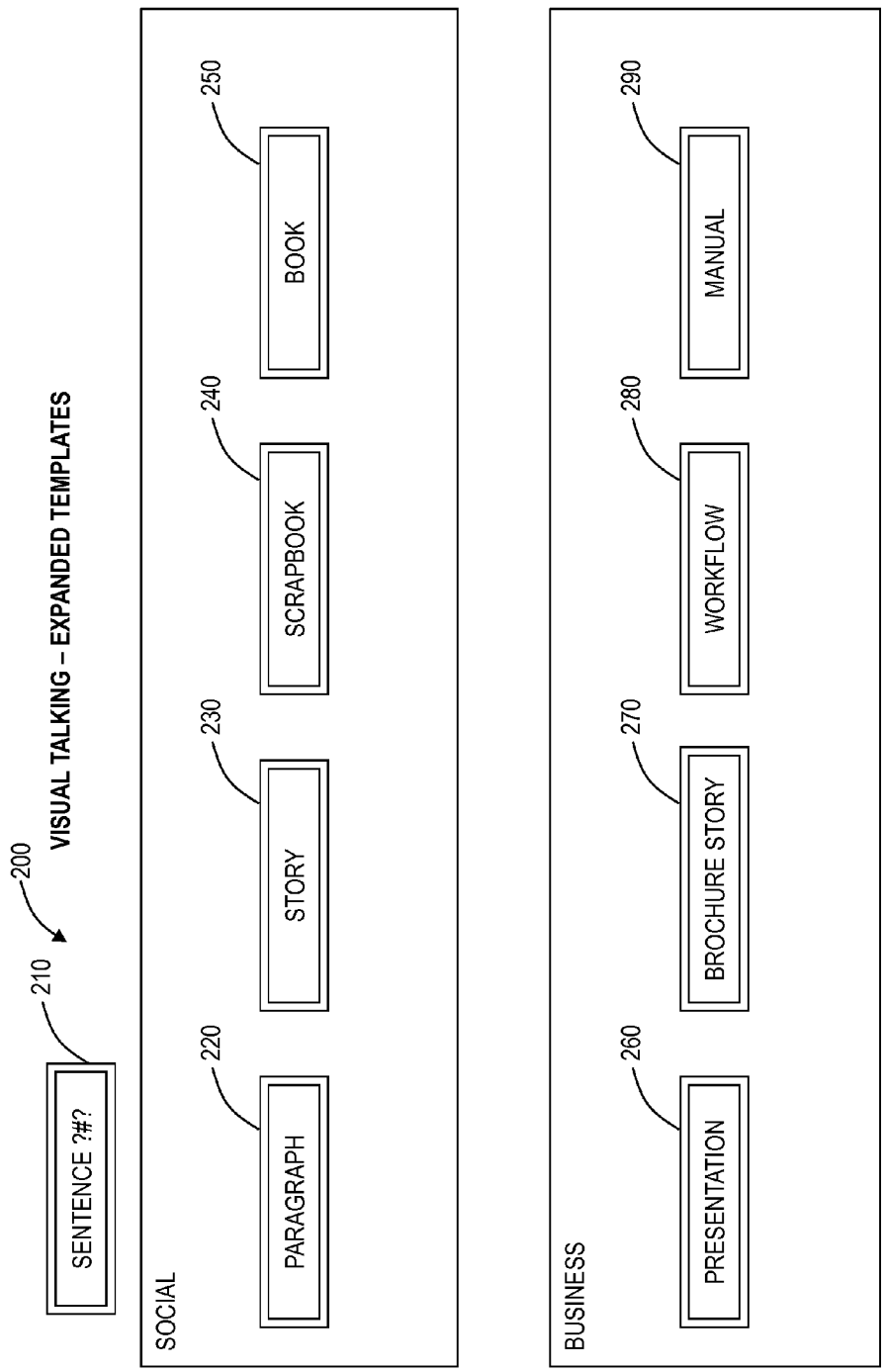
FIG. 3 illustrates an exemplary portal screen for selecting a template.

With reference to FIG. 1, after a user logs in, the user can select only one working template: (1) as a simple sentence (120), (2) as a larger template by pressing "View More" (170), or (3) as a "Respond" (160) using specific response user interface (600). Once the user selects the template, the home page (100) converts to the appropriate user interface, and the user can begin to insert pictures (300) in the appropriate locations. If the user selects "View More" (170), the user will be presented with the user interface illustrated in FIG. 3. With reference to FIG. 3, the user can select a longer sentence (210), a personal (social) template (220, 230, 240, 250), or a business template (260, 270, 280, 290).

Inserting Pictures and Words into a Template

Figure 5:
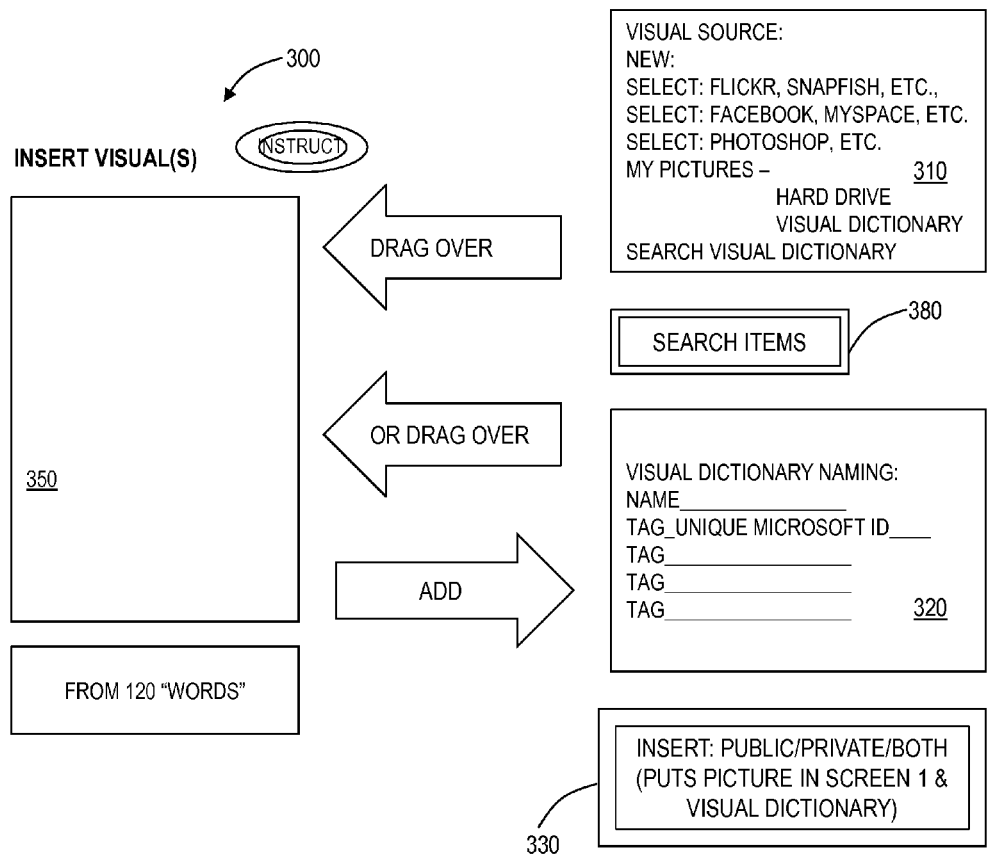
FIG. 5 illustrates an exemplary portal screen for enabling selection and tagging of pictures from a visual dictionary or external source and insertion into the template.

Words are added into a template simply by typing into the word box (131-136). Pictures are added by clicking on the appropriate visual box (121-126, depending on the template chosen) and being transported to the "insert pictures" portal (300) that is illustrated in FIG. 5. Within the insert pictures portal (300), the user can input a new picture into the work area (350) by one of two main methods: by linking (310) to an external site and selecting a picture for insertion, or by "searching terms" (380) in the visual dictionary and selecting a picture for insertion. Once the picture is inserted in the work area (350), the user can enter descriptive data into the appropriate data locations (320). Entering descriptive data into the data locations and saving this for later search creates a personal visual dictionary for the user. As with a word dictionary and a word associated with definitions, this visual dictionary has images and can be searched by a simple word from a word dictionary or can be searched by the other defined data tags (320). Once the user feels he has the right picture and all the data entered to index the picture in a visual dictionary, the user selects the "insert" button (330). This causes the picture to be inserted into the appropriate location in the template (121-126), and simultaneously into the visual dictionary with descriptive data.

Saving the Template

Figure 6:
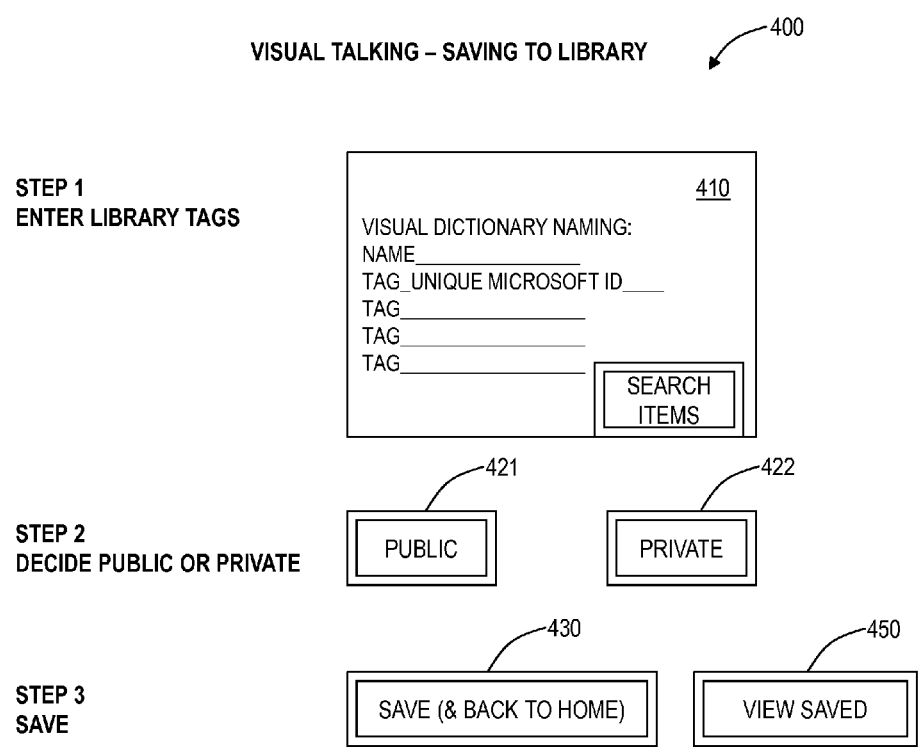
FIG. 6 illustrates an exemplary portal screen for saving the completed template to a library.

Prior to sending (150) a completed template (120), a user can save the template by pressing the save button (140). The user then enters the save portal user interface (400) as illustrated in FIG. 6. The user inputs data into the appropriate fields creating a visual library record (410). Then, the user must decide to save the record as a public (421) or as a private (422) record. Finally, the user "saves" (430) the completed template in the library and is immediately returned to the home portal (100). At any time while in the save portal, the user may search (450) all previously saved entries in the library, and when completed, return to the save portal with no changes from when the user left the save portal.

Sending the Completed Template

Figure 7:
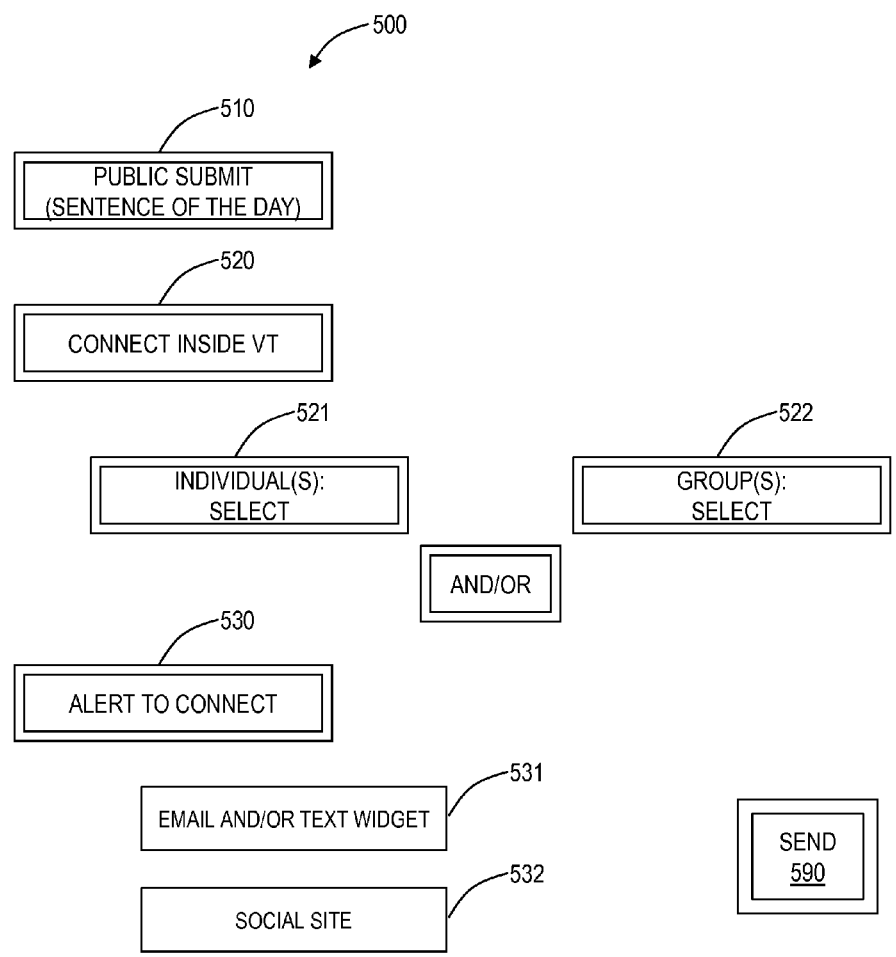
FIG. 7 illustrates an exemplary portal screen for selecting the community and sending the completed template to the community.

With the template complete and saved (140), the user sends (150) the completed template using the send portal (500). FIG. 7 illustrates an exemplary send portal. If the template is a sentence template, the user can select "Public Submit" (510) to be considered for "sentence of the day" and be published on the home portal (100) for viewing by other users. The user must choose who can review the message after login to the portal (520). The user can select individuals (521) or groups (522). If the user wants to send an external alert outside of the portal to the intended recipient (530), the user selects the appropriate alert system (531, 532). After the user selects the send button (590), the user is returned to the original home portal (100) automatically. Note, FIG. 7 illustrates an exemplary send portal that may be used over a network. Alternatively, FIG. 7 may be modifier to provide a send user interface on a mobile device with similar functions.

Responding to a Message

With reference to FIG. 2, the user knows that there is a message awaiting the user's response by seeing the "Respond" button (160) highlighted. When the user selects the respond button (160), the user is presented with the user interface (600) depicted in FIG. 4. The user can view (610) all messages awaiting response by selecting "View More" (602) and scrolling through a list of templates (i.e., sentences, etc). This scrolling mechanism operates similar to viewing the "sentence of the day" (110) as depicted in FIG. 2, and then scrolling through the sentences after pressing "View More" (101). In the user interface of FIG. 4, in order to select a message to respond to, the user clicks on "Select One" (601), and that selection is then inserted into the "design your sentence" template (620).

The "design/save/send" actions necessary to finish the design of the respond sentence are similar to the actions described above for: (1) inserting pictures and words into a template, (2) saving the template, and (3) sending the completed template. For the first action, the user selects "Visuals" (621-626) in the user interface 600 of FIG. 4, and is presented with user interface 300 of FIG. 5 to insert images. For the second action, the user selects "Save" (640) and is presented with user interface 400 of FIG. 6 to save the template. For the third action, the user selects "Send" (650) and is presented with user interface 500 of FIG. 7 to send the message. The user can press "Home" (670) and return to FIG. 2 at any time.

Edit Library of Saved Templates

Figure 4:
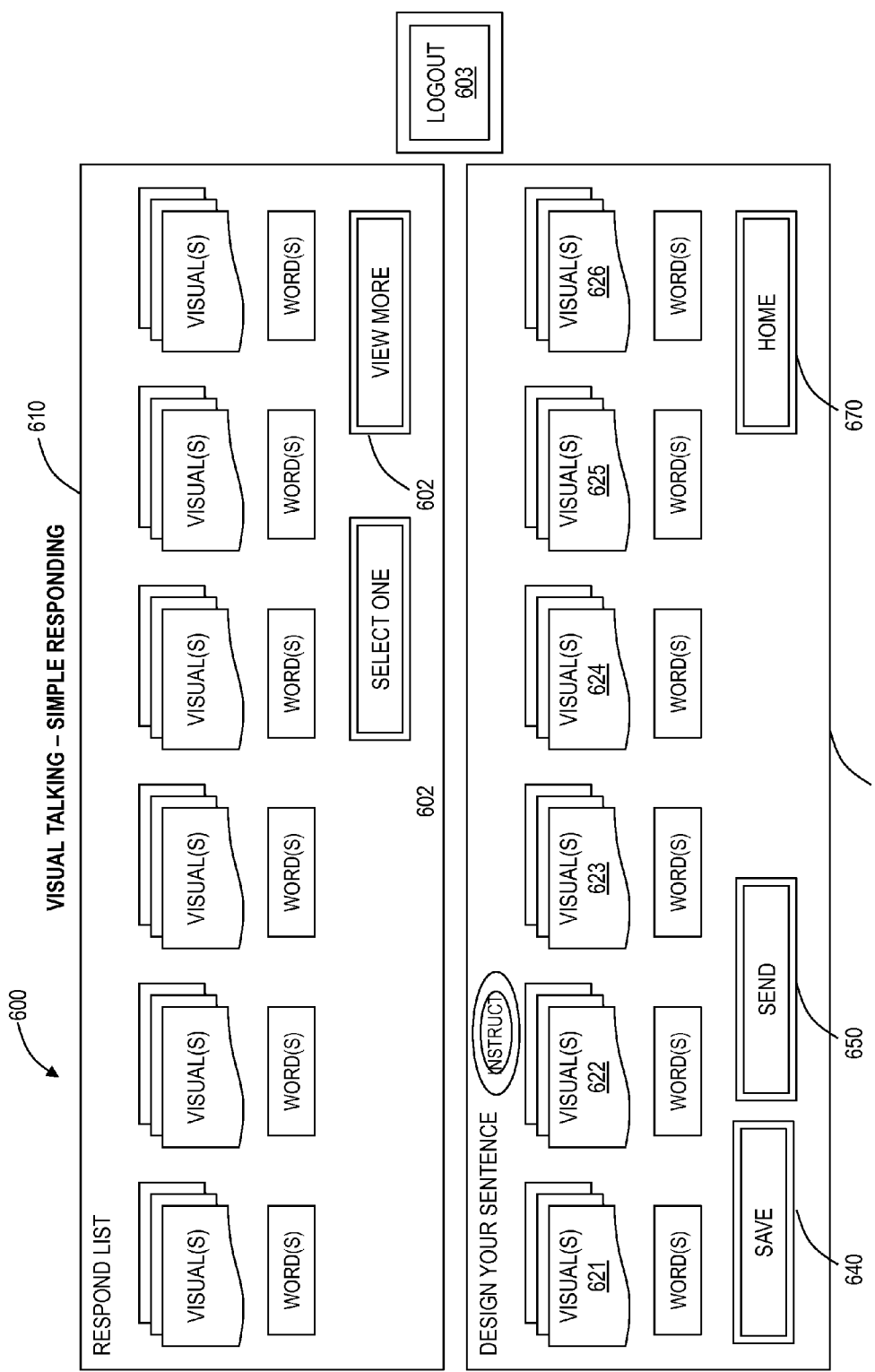
FIG. 4 illustrates an exemplary portal screen for "responding" to messages sent to the login user.
Figure 8:
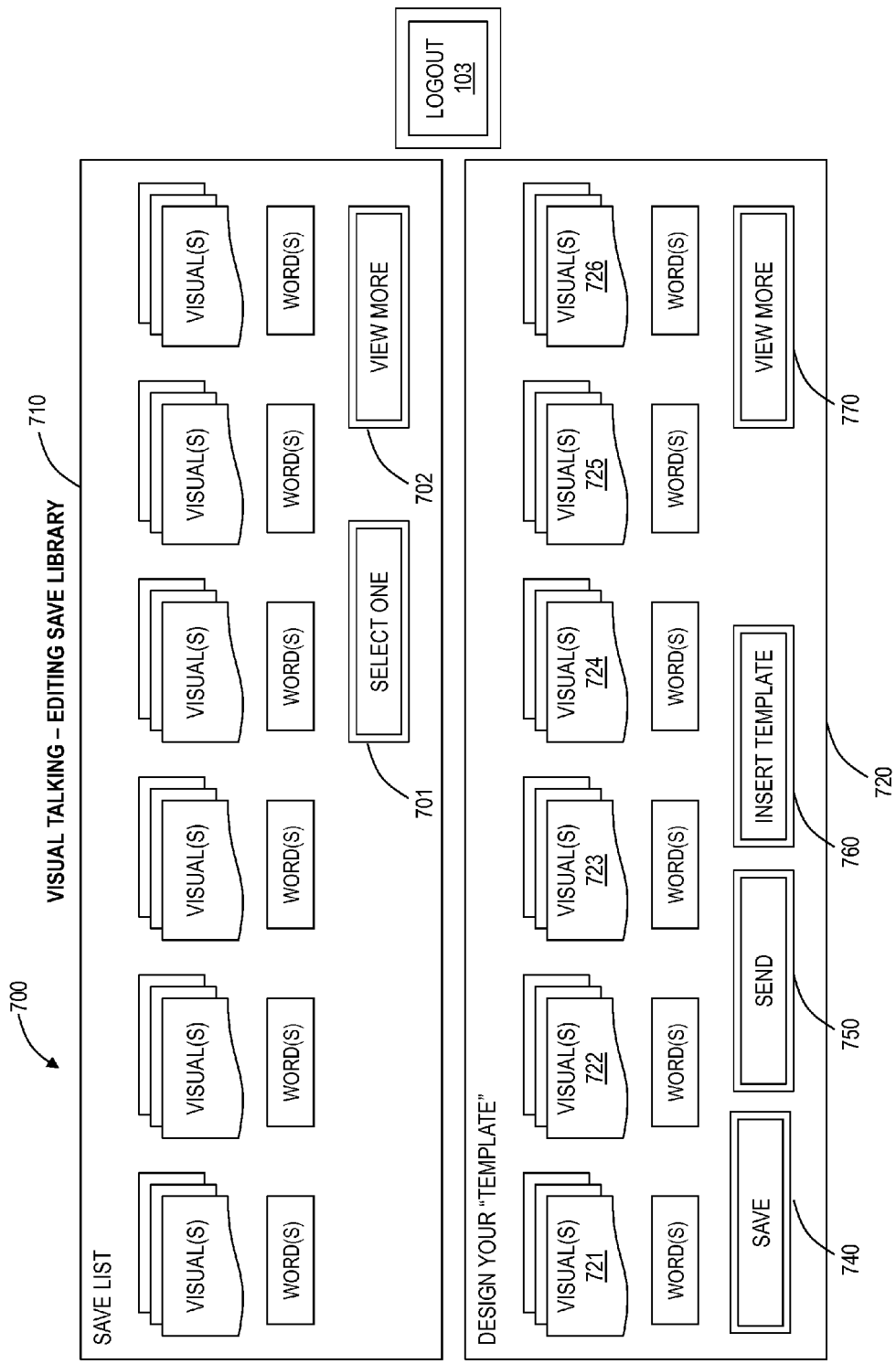
FIG. 8 illustrates an exemplary portal screen for editing the library of saved templates.

As illustrated in the user interface 700 of FIG. 8, a user may want to: (1) add to and complete a previously saved sentence (720), (2) add/insert a previously saved sentence into a larger template (760), or (3) send a previously completed sentence (750). Similar to responding to a message, as illustrated in FIG. 4, the user selects (701) a saved sentence from a list (702) and edits the saved sentence in "Design your template" (720). Once the user completes the template (720), the user has three options: (1) to save (740), (2) to send (750), or (3) to insert into a larger template (760). Selecting save (740), the user is presented with the user interface of FIG. 6. Selecting send (750), the user is presented with the user interface of FIG. 7. Selecting insert/template (760), the user is presented with the user interface of FIG. 3.

Example

Sentence Message

In creating a simple message "I love you" to send to the user's spouse, the user selects the simple sentence template (120) in the home portal (100) illustrated in FIG. 2. The user types "I" in the first word box (131), "love" in the second word box (132), and "you" in the third word box (133). Above the word "I" the user clicks (121) to go to the "insert pictures" portal (300) of FIG. 5, and selects a picture (310) from an external site where the user stored a self-image digital picture from that day. The user inserts that picture (350) and the associated data and tags (320), and selects the insert button (330) to put the image (121) above the "I" in the template 120. Next, the process is repeated for selecting the image (122) above the word "love," which happens to come from the visual dictionary on a search. The template is completed by adding a picture (123) of the intended recipient ("you") from a digital photo scanned into the "insert pictures" portal (300). With the template completed, the user selects save (140) and in the library (400) user interface of FIG. 6, adds the data (410), private (422), and saves (430). As a final step, the user presses send (150) on the user interface of FIG. 2, selects the individual (521) on the user interface of FIG. 7, and hits send (590). The message is sent to the recipient. The person to whom this message is sent has a respond button (160) flashing and responds to the message using a similar process.

Example

Very Simple Dialogue to Make a Choice While Shopping

As another example, consider a female shopper in the dressing room of a major retailer trying to match a potential new pair of shoes with the best dress from several different dress styles. While in the dressing room, the shopper tries on each dress with the pair of shoes and takes a digital picture of herself on her cell phone and stores each image. After taking all the needed dress pictures, the shopper logs into the portal (100) and enters the design a sentence template (120). The shopper types "Which dress?" into the first word box and then above this word box the shopper clicks (121) to go to the "insert pictures" portal (300). From her saved digital pictures (310), the shopper individually adds each picture taken to the insert visuals (350), and without saving these temporary pictures in the visual dictionary (320), the shopper inserts (330) the pictures into the sentence (121) in one box, and skipping save (140), selects send (150) to send the message to her friend. The person to whom this message is sent responds (160) using a similar process, selects the best dress and sends the response to the shopper. The shopper then leaves the dressing room and buys the selected dress.

Example

Paragraph Message Leading to a Book Template

Figure 9:
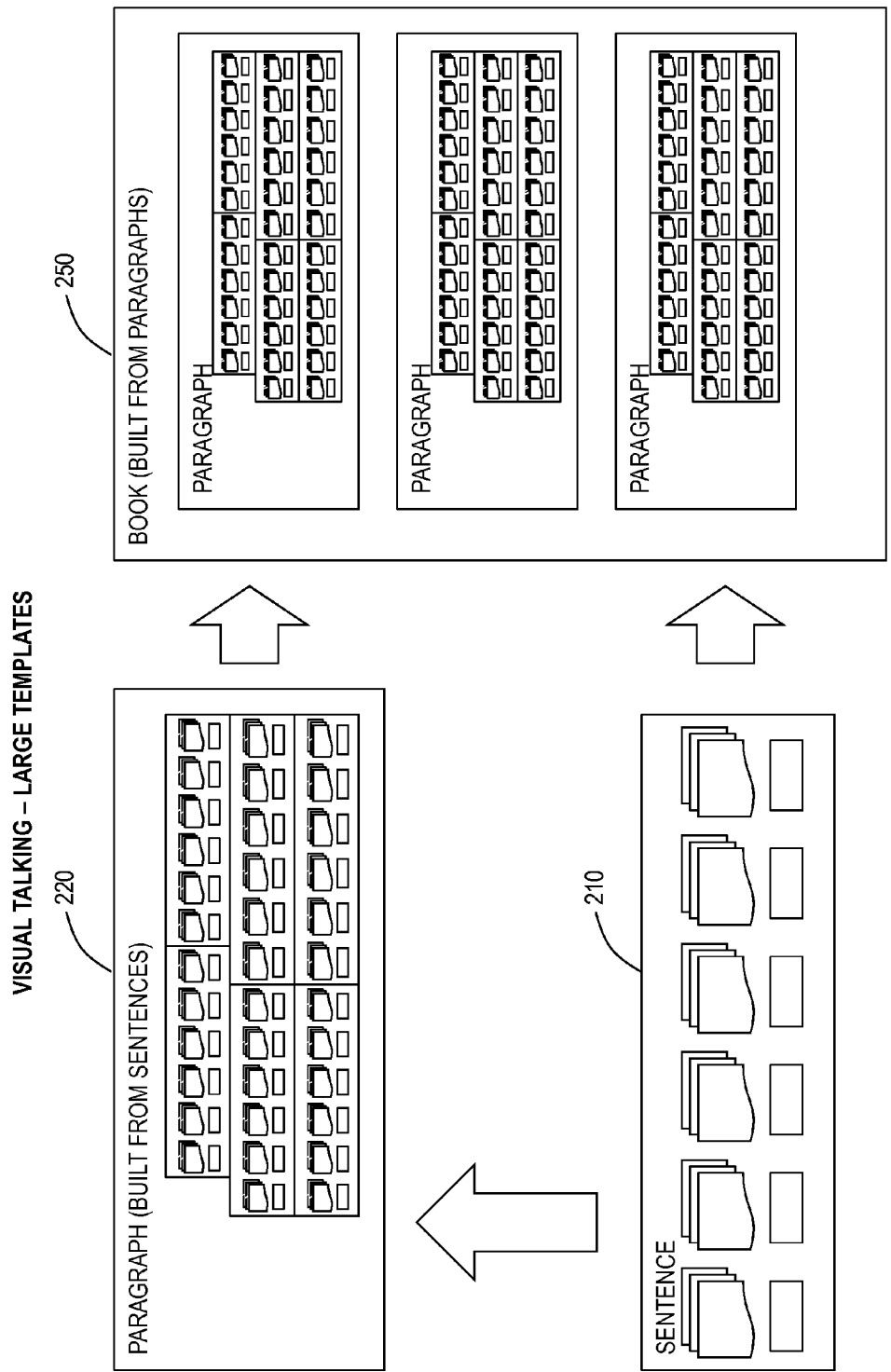
FIG. 9 illustrates an exemplary flow of how to construct a paragraph or book from a plurality of saved sentences.

With reference to FIG. 9, one method to make a paragraph is to create individual sentences (120 or 210), save them individually in the library (410), and add the sentences individually to the paragraph template (220) by using the save library insert template (720) and the select one (701) sentence from viewing the saved sentences (710). For example, consider a user that wants to send the following message to a group of friends: "I went for a walk in the woods. The trees were in full bloom. I saw birds romancing and I heard their songs. I turned over a rock and saw all kinds of critters . . ." During the walk, the user took many digital photos of the woods, the trees, the blooms, birds, critters, etc. For each sentence, the user builds the sentence using the design your sentence template (120) as described in the simple example above, and saves each sentence in the library (410), but does not send the sentences saved. Once all sentences are completed and saved, using the interface of FIG. 8, the user edits the save library (720), selects insert template (760) to select a paragraph (220), clicks "select one" (701) to choose a previously saved sentence, and inserts the sentence into the paragraph template. Once the paragraph is complete the user saves (400) the paragraph and sends the paragraph (500) to a group (522) of friends.

With reference to FIG. 9, the user can create a book, story, or longer template by saving individual paragraphs (220) and then combining the paragraphs together in a book template (250). Combining paragraphs can include editing and manipulation of a plurality of saved sentence templates. The book building process is similar to the paragraph building process described above.

Example

How to Manual at Work

With reference again to FIG. 9, a how to instruction manual at work can be built easily by creating simple sentence (210) instructions and then adding each sentence instruction in a sequenced list to the manual template which is similar to a book template.

Example

Maintenance Worker Asking for Best Way to Fix Trouble at Remote Site

Similar to the shopper example above, consider a maintenance worker who could be at a local site to repair a machine, but needs expert advice from the central office.

Similar to the shopper example, the maintenance worker takes pictures of the machine in action and uses these pictures in sentences sent to the expert, for the expert to select the best way forward. The maintenance worker performs the work recommended by the remote expert and records this success in a workflow (280) template. Furthermore, the maintenance worker can go to the save library (700) and view the pictoral operating manual (290) for the machine.

Web Portal

Referring to FIG. 10, in an exemplary embodiment, a block diagram illustrates a server 1200 which may be utilized in an exemplary implementation of the web portal 10. The web portal 10 may be formed through one or more servers 1200. The server 1200 may be a digital computer that, in terms of hardware architecture, generally includes a processor 1202, input/output (I/O) interfaces 1204, a network interface 1206, a data store 1208, and a memory 1210. It should be appreciated by those of ordinary skill in the art that FIG. 10 depicts the server 1200 in an oversimplified manner, and a practical embodiment may include additional components and suitably configured processing logic to support known or conventional operating features that are not described in detail herein. The components (1202, 1204, 1206, 1208, and 1210) are communicatively coupled via a local interface 1212. The local interface 1212 may be, for example but not limited to, one or more buses or other wired or wireless connections, as is known in the art. The local interface 1212 may have additional elements, which are omitted for simplicity, such as controllers, buffers (caches), drivers, repeaters, and receivers, among many others, to enable communications. Further, the local interface 1212 may include address, control, and/or data connections to enable appropriate communications among the aforementioned components.

The processor 1202 is a hardware device for executing software instructions. The processor 1202 may be any custom made or commercially available processor, a central processing unit (CPU), an auxiliary processor among several processors associated with the server 1200, a semiconductor-based microprocessor (in the form of a microchip or chip set), or generally any device for executing software instructions. When the server 1200 is in operation, the processor 1202 is configured to execute software stored within the memory 1210, to communicate data to and from the memory 1210, and to generally control operations of the server 1200 pursuant to the software instructions. The I/O interfaces 1204 may be used to receive user input from and/or for providing system output to one or more devices or components. User input may be provided via, for example, a keyboard, touch pad, and/or a mouse. System output may be provided via a display device and a printer (not shown). I/O interfaces 1204 can include, for example, a serial port, a parallel port, a small computer system interface (SCSI), an infrared (IR) interface, a radio frequency (RF) interface, and/or a universal serial bus (USB) interface.

The network interface 1206 may be used to enable the server 1200 to communicate on a network, such as the Internet and the like, etc. For example, the server 1200 can utilize the network interface 1206 to communicate to/from a plurality of users of the web portal 10, etc. The network interface 1206 may include, for example, an Ethernet card or adapter (e.g., 10BaseT, Fast Ethernet, Gigabit Ethernet) or a wireless local area network (WLAN) card or adapter (e.g., 802.11a/b/g/n). The network interface 1206 may include address, control, and/or data connections to enable appropriate communications on the network. A data store 1208 may be used to store data. The data store 1208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1208 may incorporate electronic, magnetic, optical, and/or other types of storage media. In one example, the data store 1208 may be located internal to the server 1200 such as, for example, an internal hard drive connected to the local interface 1212 in the server 1200. Additionally in another embodiment, the data store 1208 may be located external to the server 1200 such as, for example, an external hard drive connected to the I/O interfaces 1204 (e.g., SCSI or USB connection). In a further embodiment, the data store 1208 may be connected to the server 1200 through a network, such as, for example, a network attached file server.

The memory 1210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1210 may incorporate electronic, magnetic, optical, and/or other types of storage media. Note that the memory 1210 may have a distributed architecture, where various components are situated remotely from one another, but can be accessed by the processor 1202. The software in memory 1210 may include one or more software programs, each of which includes an ordered listing of executable instructions for implementing logical functions. The software in the memory 1210 includes a suitable operating system (O/S) 1214 and one or more programs 1206. The operating system 1214 essentially controls the execution of other computer programs, such as the one or more programs 1206, and provides scheduling, input-output control, file and data management, memory management, and communication control and related services. The operating system 1214 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like. The one or more programs 1216 may be configured to implement the various processes, algorithms, methods, techniques, etc. described herein with respect to the web portal 10 and the like.

Mobile Device

Figure 11:
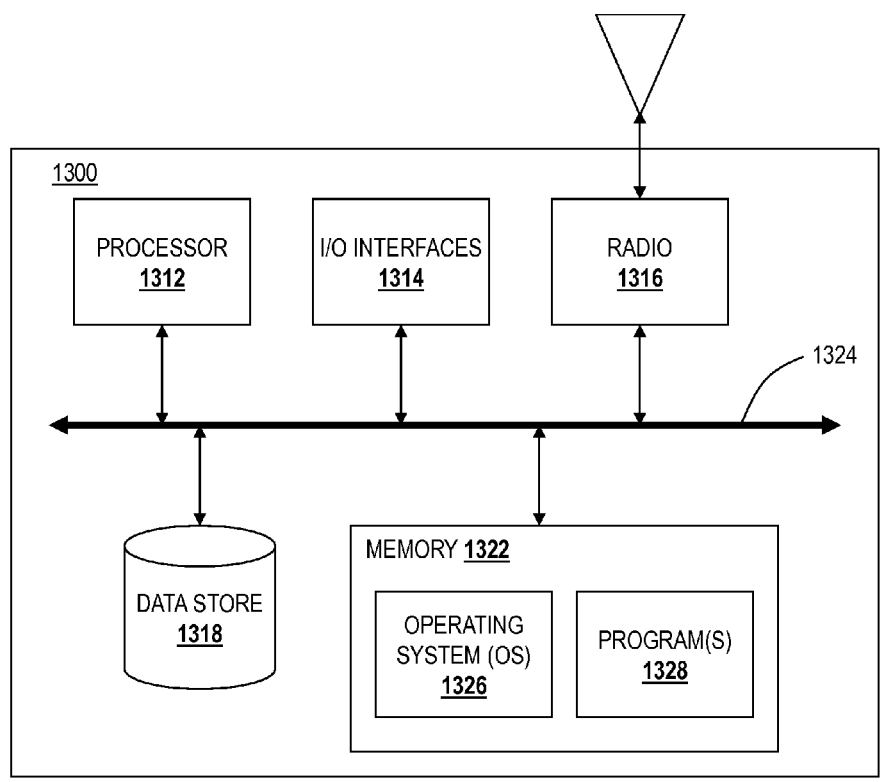
FIG. 11 illustrates an exemplary block diagram of a mobile device which may be utilized to provide mobile communications with sequential images.

Referring to FIG. 11, in an exemplary embodiment, the present disclosure may include a mobile device 1300 with various components configured for providing mobile communications using sequenced images. The mobile device 1300 may be a cell phone, smart phone, portable digital accessory (PDA), tablet device, laptop computer, and the like. The mobile device 1300 may be a digital device that, in terms of hardware architecture, generally includes a processor 1312, input/output (I/O) interfaces 1314, a radio 1316, a data store 1318, and memory 1322. It should be appreciated by those of ordinary skill in the art that FIG. 11 depicts the mobile device 1310 in an oversimplified manner, and a practical embodiment may include additional components and suitably configured processing logic to support known or conventional operating features that are not described in detail herein. The components (1312, 1314, 1316, 1318, 1320, and 1322) are communicatively coupled via a local interface 1324. The local interface 1324 can be, for example but not limited to, one or more buses or other wired or wireless connections, as is known in the art. The local interface 1324 can have additional elements, which are omitted for simplicity, such as controllers, buffers (caches), drivers, repeaters, and receivers, among many others, to enable communications. Further, the local interface 1324 can include address, control, and/or data connections to enable appropriate communications among the aforementioned components.

The processor 1312 is a hardware device for executing software instructions. The processor 1312 can be any custom made or commercially available processor, a central processing unit (CPU), an auxiliary processor among several processors associated with the mobile device 1310, a semiconductor-based microprocessor (in the form of a microchip or chip set), or generally any device for executing software instructions. When the mobile device 1310 is in operation, the processor 1312 is configured to execute software stored within the memory 1322, to communicate data to and from the memory 1322, and to generally control operations of the mobile device 1310 pursuant to the software instructions. The I/O interfaces 1314 can be used to receive user input from and/or for providing system output to one or more devices or components. User input can be provided via, for example, a keyboard, a keypad, a mouse, a scroll bar, buttons, and the like. System output can be provided via a display device such as a liquid crystal display (LCD), touch screen, and the like. The I/O interfaces 1314 can also include, for example, a serial port, a parallel port, a small computer system interface (SCSI), an infrared (IR) interface, a radio frequency (RF) interface, and/or a universal serial bus (USB) interface. The I/O interfaces 1314 can include a graphical user interface (GUI) that enables a user to interact with the mobile device 1310. Furthermore, the I/O interfaces 1314 may include a camera and/or video camera device configured to obtain images. The camera may be utilized in conjunction with the dialog presented in FIG. 6 with providing new images for use in communications.

The radio 1316 enables wireless communication to an external access device or network. Any number of suitable wireless data communication protocols, techniques, or methodologies can be supported by the radio 16, including, without limitation: RF; IrDA (infrared); Bluetooth; ZigBee (and other variants of the IEEE 802.15 protocol); IEEE 802.11

(any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. The data store 1318 can be used to store data. The data store 1318 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1318 can incorporate electronic, magnetic, optical, and/or other types of storage media.

The memory 1322 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1322 may incorporate electronic, magnetic, optical, and/or other types of storage media. Note that the memory 1322 can have a distributed architecture, where various components are situated remotely from one another, but can be accessed by the processor 1312. The software in memory 1322 can include one or more software programs, each of which includes an ordered listing of executable instructions for implementing logical functions. In the example of FIG. 11, the software in the memory system 1322 includes a suitable operating system (O/S) 1326 and programs 1328. The operating system 1326 essentially controls the execution of other computer programs, and provides scheduling, input-output control, file and data management, memory management, and communication control and related services. The operating system 1326 can be any of LINUX (or another UNIX variant), Android (available from Google), Symbian OS, Microsoft Windows CE, iPhone OS (available from Apple, Inc.), Palm OS, Blackberry OS, and the like.

Exemplary System Configurations

Referring to FIG. 12, in exemplary embodiments, various diagrams illustrate exemplary operational scenarios providing mobile communications using sequenced images. As described herein, the systems and methods of the present disclosure enable communications between users using sequenced images. FIG. 12 illustrates two exemplary operational scenarios including a web portal-based scenario 1400 and an application-based scenario 1402. Each of these exemplary scenarios 1400, 1402 may be utilized to perform the systems and methods described herein.

In an exemplary embodiment, the web portal-based scenario 1400 includes a web portal 1410 connected to a plurality of users 1412 via a network 1414, such as the Internet. Here, the plurality of users 1412 may include laptop computers, desktop computers, tablets, mobile devices, and the like connected to the network 1414, e.g. through wired connections (cable modem, digital subscriber loop (DSL), dial-up, Ethernet, etc.) or wireless connections (3G/4G cellular, WLAN, WIMAX, etc.). One of the users 1412 may access the web portal 1410, such as described in FIG. 1A, and create a message of sequenced images via the web portal 1410. Once created, the message may be sent via the web portal 1410 to another of the users 1412. For example, the message may be sent through any form known in the art, including, but not limited to, emails, web link, picture message via Multimedia Messaging Service (MMS), text message via Short Message Service (SMS), tweet via Twitter®, instant message, Facebook® update, and the like. Of note, in the web portal-based scenario 1400, the message is created on the web portal 1410 using a UI and associated dictionaries connected to the web portal 1410. That is, the users 1412 may implement any of the methods, processes, mechanisms, etc. described herein in FIGS. 1-9 via the web portal 1410.

In another exemplary embodiment, the application-based scenario 1402 includes a first user 1420 communicatively coupled to a second user 1422 via a network 1424. In one exemplary embodiment, the first user 1420 may include a mobile device such as the mobile device 1300 and the network 1424 may include a wireless network (e.g. 3G/4G cellular, WLAN, WIMAX, etc.). Here, the mobile device 1300 includes an application in the programs 1328 that may be referred to as a visual dictionary application. The application is configured to provide similar functionality as the web portal 1410. Specifically, the application may be configured to implement any of the methods, processes, mechanisms, etc. described herein in FIGS. 1-9. Using the application, the first user 1420 may create a message of sequenced images on the mobile device 1300. The application may allow the first user 1420 to send the message to the second user 1422 via the network 1424. For example, the message may be sent through any form known in the art, including, but not limited to, emails, web link, picture message via Multimedia Messaging Service (MMS), text message via Short Message Service (SMS), tweet via Twitter®, instant message, Facebook® update, and the like. The second user 1422 does not necessarily have to be configured with the application for receipt of the message. The second user 1422 may receive the message via conventional mechanisms.

In an exemplary embodiment in the application-based scenario 1402, the first user 1420 may connect once or periodically to the web portal 1410 (or another server). For example, the web portal 1410 may provide the application in downloaded form to the mobile device 1300. It is expected that the first user 1420 may connect to the web portal 1410 for initial download and installation of the application. Furthermore, the first user 1420 may connect to the web portal 1410 periodically for updates, image synchronization, and the like.

In both the web portal-based scenario 1400 and the application-based scenario 1402, the web portal 1410 may include a visual dictionary as part of the data store 1208 and the memory 1210. As described herein, the visual dictionary includes a plurality of images used to create messages. FIG. 5 illustrates using the visual dictionary for creating a message, and FIG. 6 illustrates adding new images into the visual dictionary. In the web portal-based scenario 1400, the visual dictionary may be extremely large with billions and billions of images stored at the web portal 1410. Note, each user may have a customized visual dictionary, but a particular image may be stored once and tagged separately for each user. That is, the visual dictionary for the web portal 1410 may include a vast plurality of images along with individual dictionaries for a plurality of users with the individual dictionaries including specific images of the plurality of images.

In the application-based scenario 1402, the visual dictionary may be referred to as a local visual dictionary that is stored within the mobile device 1300 (e.g. in the data store 1318, the memory 1322, etc.). The application-based scenario 1402 may be constrained in an amount of storage available at the mobile device 1300 for the visual dictionary. As storage amounts increase in the mobile device 1300, the local visual dictionary may include more images. In an exemplary embodiment, the local visual dictionary may include a subset of the plurality of images stored in the web portal 1410. This subset may be user-defined, dynamically adjusted based on usage history, predetermined, and the like. Furthermore, the mobile device 1300 may synchronize with the web portal 1410 on a periodic basis to upload/download new images and the like.

In an exemplary embodiment, a user in the application-based scenario 1402 may also be a user in the web portal-based scenario 1400. Here, the user may define a visual dictionary on the web portal 1410 that is synchronized with the mobile device 1300. For example, the user may enter the web portal and select particular images of the plurality of images on the web portal 1410 for use in the local visual dictionary. Alternatively, the web portal 1410 may be configured to cache recently used images of the user and to synchronize these in the local visual dictionary.

Palette of Forms

Referring to FIGS. 13-24, in various exemplary embodiments, the present disclosure may be utilized building and managing a layered dialogue of a community using electronic dialogue communication amongst a plurality of users. Since the invention of the printing press, words have dominated communication, and there are few other communication methods beside the "I talk, you listen and respond" format, and their use is very limited, such as hand sign language for the deaf. More recently, with the advent of text messaging, a limited set of simple symbols, like "smiley or sad faces" are being added to word messages. These simple symbols lack any rich or descriptive meaning and as such, are normally used to end a conversation. Still, the simple symbols are put in simple word sentences and inserted into the "I talk, you listen and respond" conversation format.

The electronic communications dialog systems and methods described herein utilizes sentences based on images as the fundamental component of a sentence. However, this new system continues to use the "I talk, you listen and respond" conversation format demanded by word-based systems. It is as though the command and control mechanism of the spoken or written word is commanding the communication using images, where no such command and control is required. The electronic communications dialog systems and methods described herein may be utilized to allow unique and flexible methods to create a new conversation flow of image, sentences, or visual templates for individuals or defined communities. Without the use of words, and by using images, hundreds (or thousands or millions of geographically diverse language backgrounds) of community members may visually talk simultaneously or in new organized flows.

The current "I talk, you listen" command and control communication mechanism may be replaced by a system and method that uses visual templates uniquely inserted, arranged, rearranged, and reused in many new conversation style forums assembled in a predetermined sequence for a specific community, e.g. inserting a visual template of a complete new business idea in an editor forum ensures it will be focused upon, and then inserted in a circle peer forum to expand the idea, and finally to be inserted into a workflow forum to be approved and quickly implemented ensures that the idea gets fully explored, expanded, approved and then correctly implemented. Three different command and control communication mechanism where used on one template distributed among many forums and an unlimited number of members. Therefore, it is desirable to build a communication system and method that uses visual templates inserted into any number of predetermined forum styles organized in a precise flow by community members.

Figure 13:
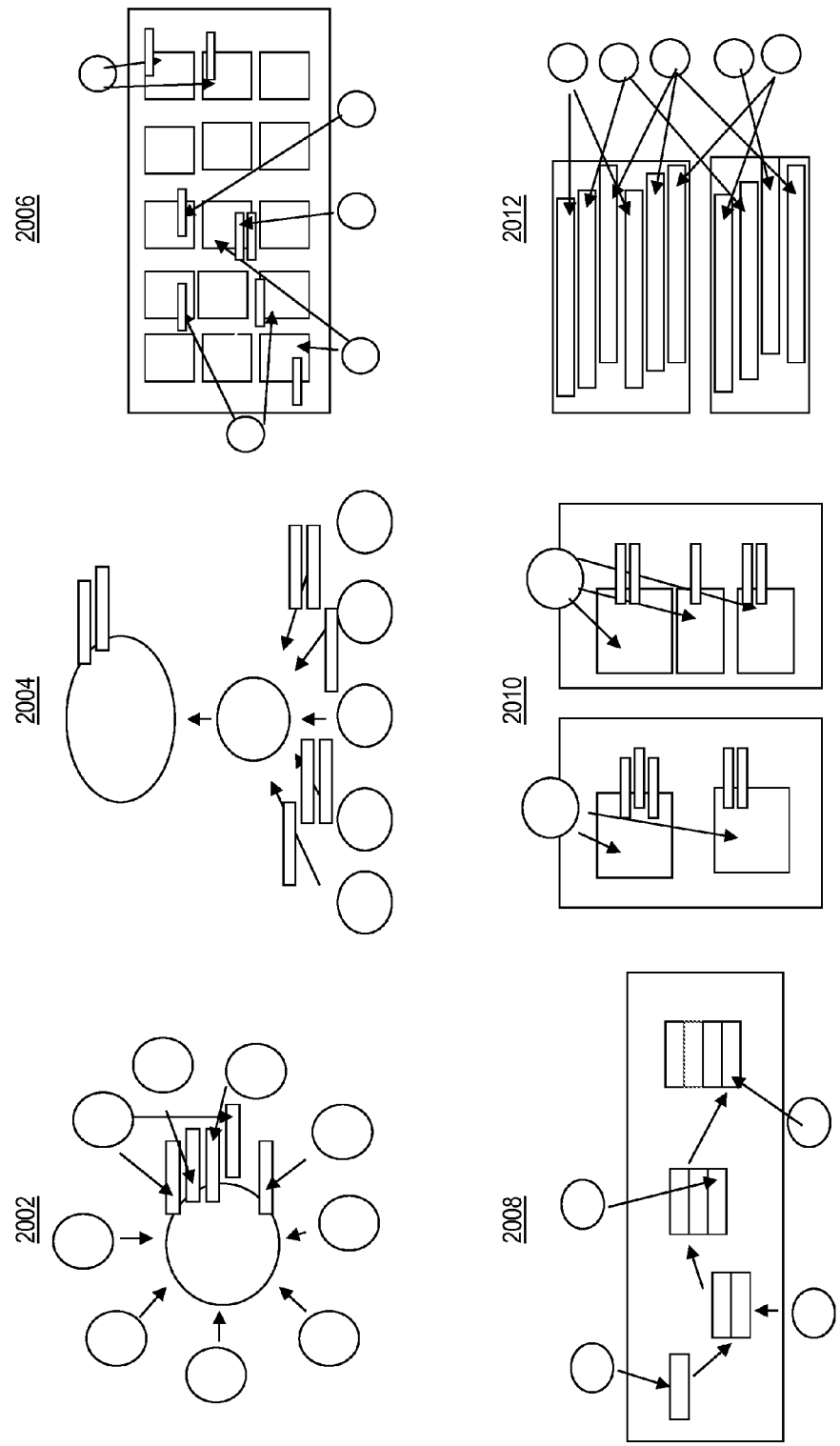
FIG. 13 illustrates an exemplary block diagram of a sample of the possible conversation forum styles used individually or in a collective process flow for a community.

Collectively, FIGS. 13-24 described a "palette of forms" using the electronic communications dialog systems and methods described herein outside the standard "I talk, you listen" structure. FIG. 13 illustrates an overview of the palette which contains a sample of the possible conversation forum styles used individually or in a collective process flow for a community. Specifically, exemplary conversation forum styles may include a circle peer forum 2002 described in FIG. 15, an editor forum 2004 described in FIG. 16, a topic wall 2006 described in FIG. 17, a workflow forum 2008 described in FIG. 18, posting style 2010 described in FIG. 19, and linear style 2012 described in FIG. 20. FIGS. 15-20 illustrate exemplary forums that may be created using the visual image communication system and method of the present disclosure. A lead member may select a particular forum style or styles for the community and put them in a defined sequence (examples are illustrated in FIGS. 21-24). Individual members may access the community forums by entering a portal (via computer browser, a PDA browser, smart phone browser, etc), joining a community, and entering their visual templates in the specific forum or flow of forums.

Figure 14:
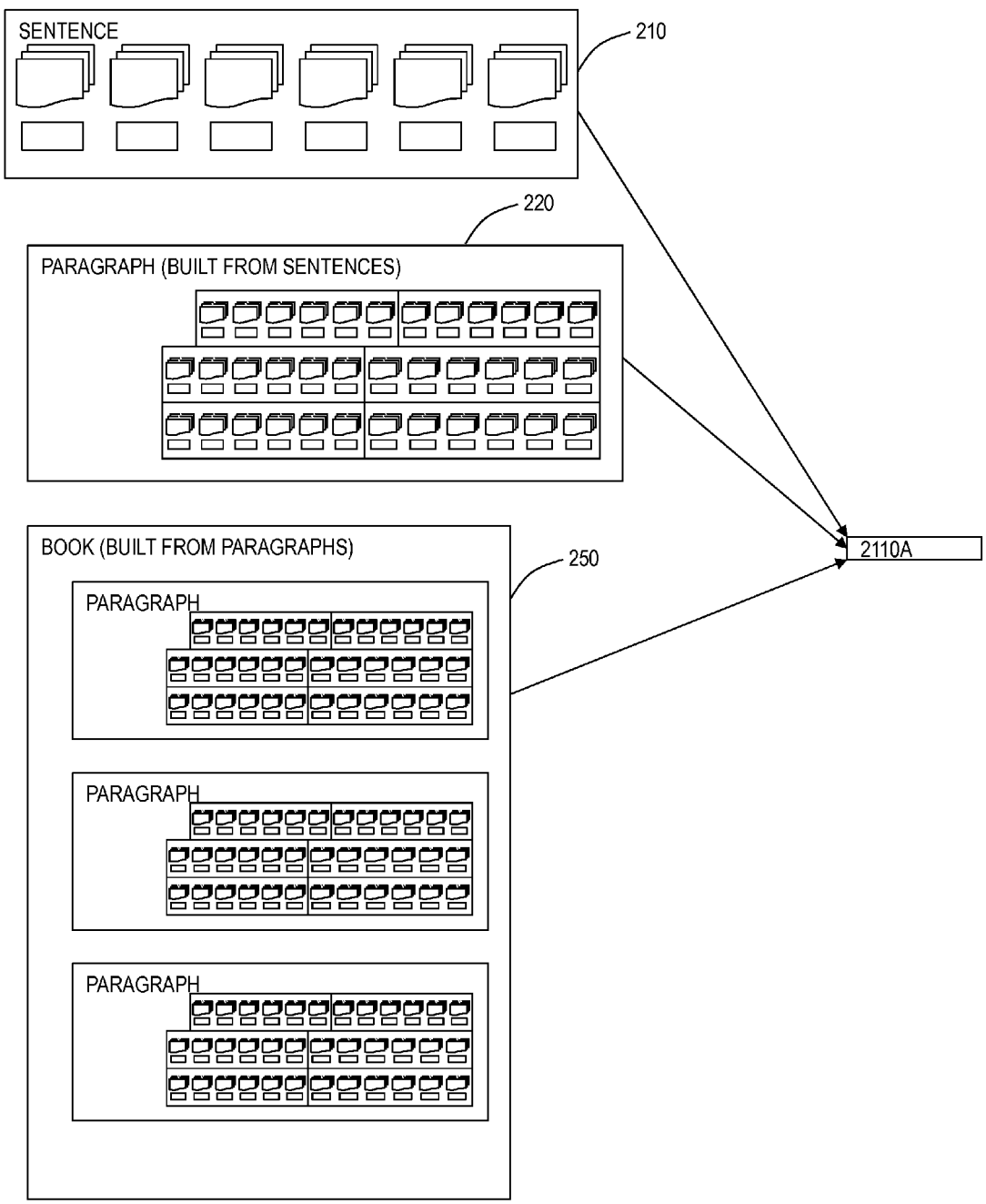
FIG. 14 illustrates a visual template which may be used a conversation sentences, threads, etc. flowing through the structure of forums.

FIG. 14 illustrates a visual template 2110A which may be used in a conversation sentences, threads, etc. flowing through the structure of the forums described in FIGS. 15-20. As described in FIG. 9, the visual template 2110A may include a visual sentence 210, a visual paragraph 220, a visual book 250, and the like, each of which contain images as the basic foundation for conveying a message. In FIGS. 15-20, this visual template 2110A structure is summarized in a message block (2110A) from a specific member (10), for example 2110A is the first visual template message from member 10 with the last digits referring to the member and A referring to the first message sent. Further, 2110B is the send message from member 10, 2111A is a first message from member 11, etc. In this manner, FIGS. 15-20 illustrate message flows from various members 2200 using the visual templates 21XXn where XX is the member on the FIG. and n is the sequenced message from the member.

Figure 15:
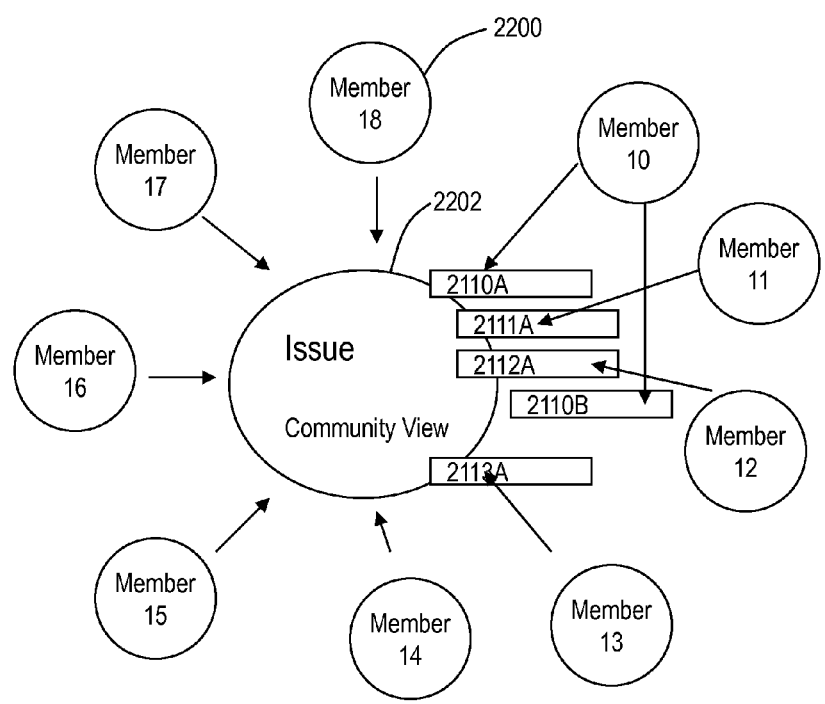
FIG. 15 illustrates the circle peer forum where an entire community of members may access to view, respond, etc. to all visual templates.

FIG. 15 illustrates the circle peer forum 2002 where an entire community of members 2200 may access to view, respond, etc. to all visual templates 2110. The circle peer forum 2002 conversation style allows all members 2200 (10, 11, 12, 13, 14, etc) to see all other members visual templates 2110 and to respond to all other visual templates. For example, the various visual templates 2110 may be "posted" in a community view 2202 where all members 2200 may view, respond, etc. The community view 2202 may be physically stored at web portal 10 and accessed by the members 2200 via a mobile device 1300 or the like. The circle peer forum 2002 is useful for openly discussing an issue (a point, an idea, etc) to get all relevant facts, points of view, etc. to fully understand the issue. In operation, a member 2200 may click on any visual template 2110 from another member (e.g. the visual template 2110A) and respond (e.g. the visual template 2110B), and other members 2200 may respond to any of the other members 2200 and the circle peer forum 2002 keeps track.

Figure 16:
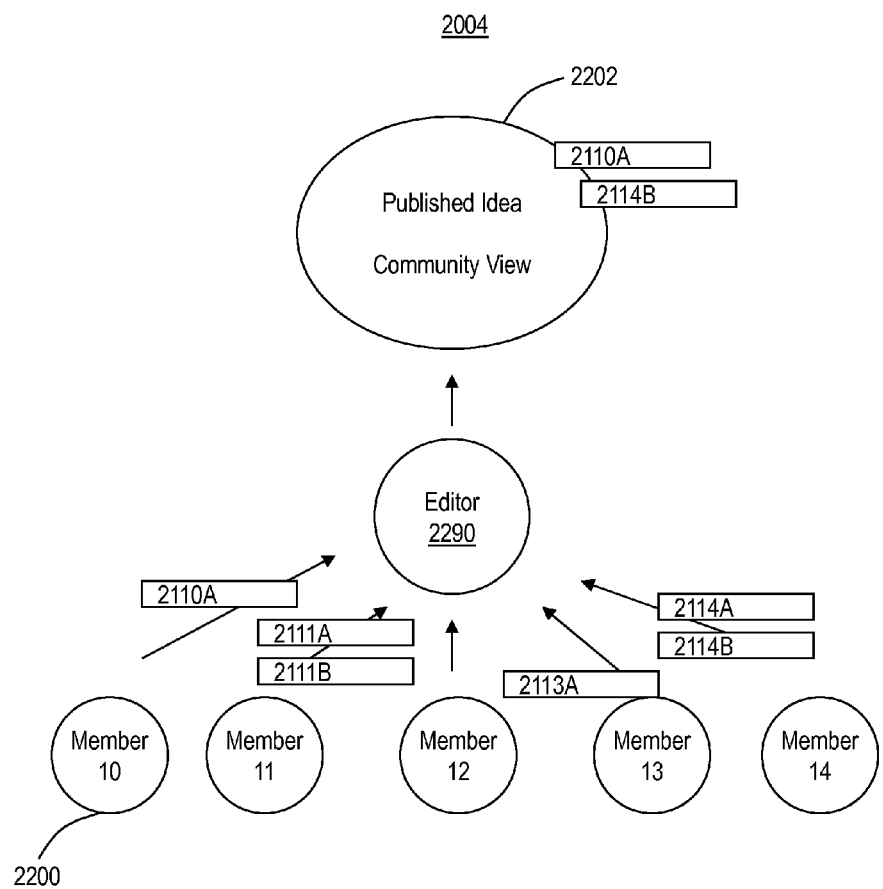
FIG. 16 illustrates the editor forum where an entire community submits their visual templates to one editor.

FIG. 16 illustrates the editor forum 2004 where an entire community submits their visual templates 2110 to one editor 2290, and the editor 2290 is the only one who can see these submitted visual templates 2110, but the editor 2290 selects some visual templates 2110 to publish to the entire community to see in the community view 2202. The editor forum 2004 is particularly useful for communities who want to have a clear decision on all conversations. For example, in FIG. 16, the editor 2290 selects only the visual templates 2110A, 2114B for the community view 2202.

Figure 17:
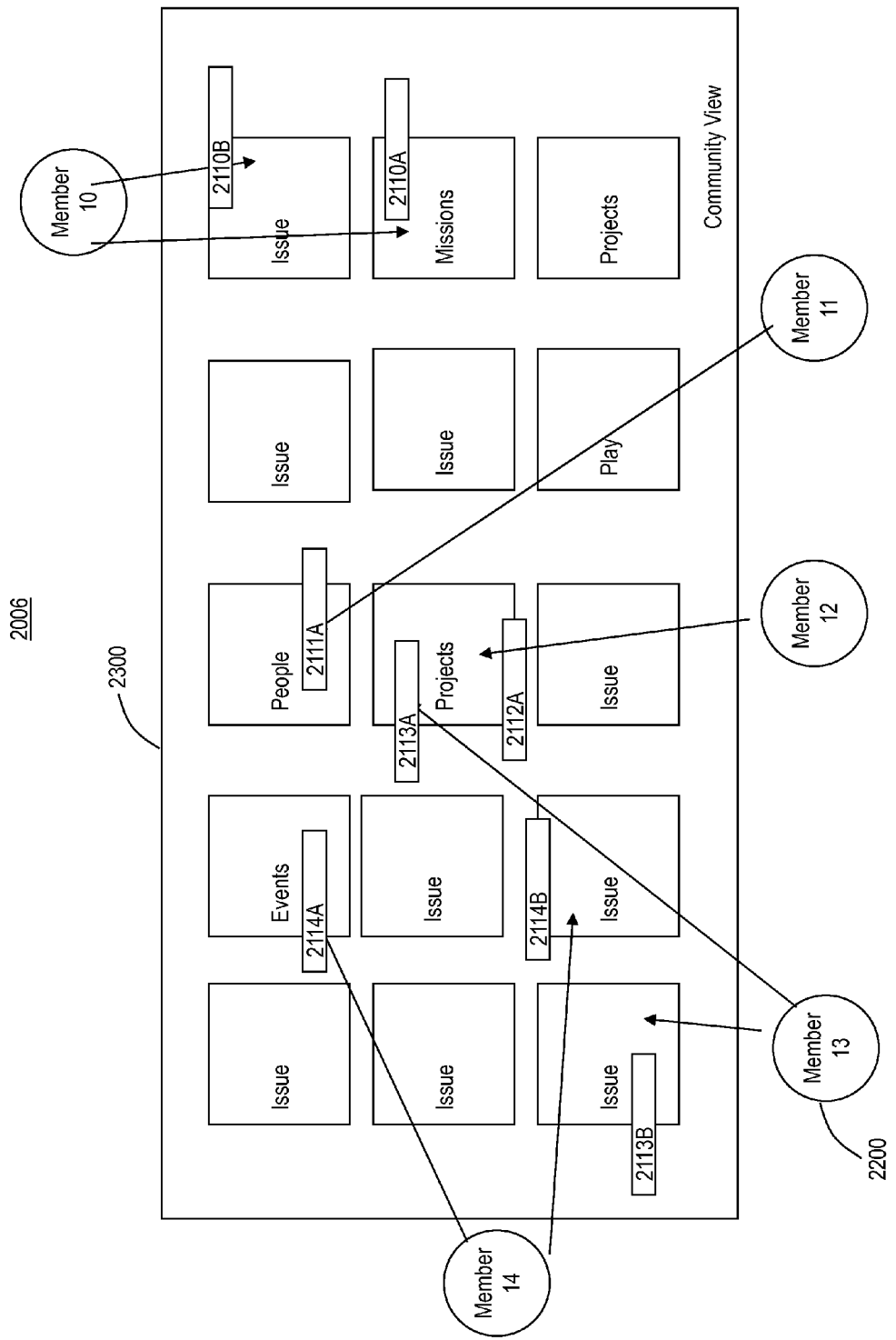
FIG. 17 illustrates the topic wall where all the members can select a specific issue on a topic and submit the visual templates to that issue for other to view.

FIG. 17 illustrates the topic wall 2006 where all the members 2200 can select a specific issue on a topic wall 2300 and submit the visual templates 2110 to that issue for others to view. The topic wall 2006 is particularly useful for large communities that have many different subjects to discuss. For example, the topic wall 2300 may be physically stored at web portal 10 and accessed by the members 2200 via a mobile device 1300 or the like. The topic wall 2006 may include any topic such as, for example, issues, events, people, projects, missions, play, etc.

Figure 18:
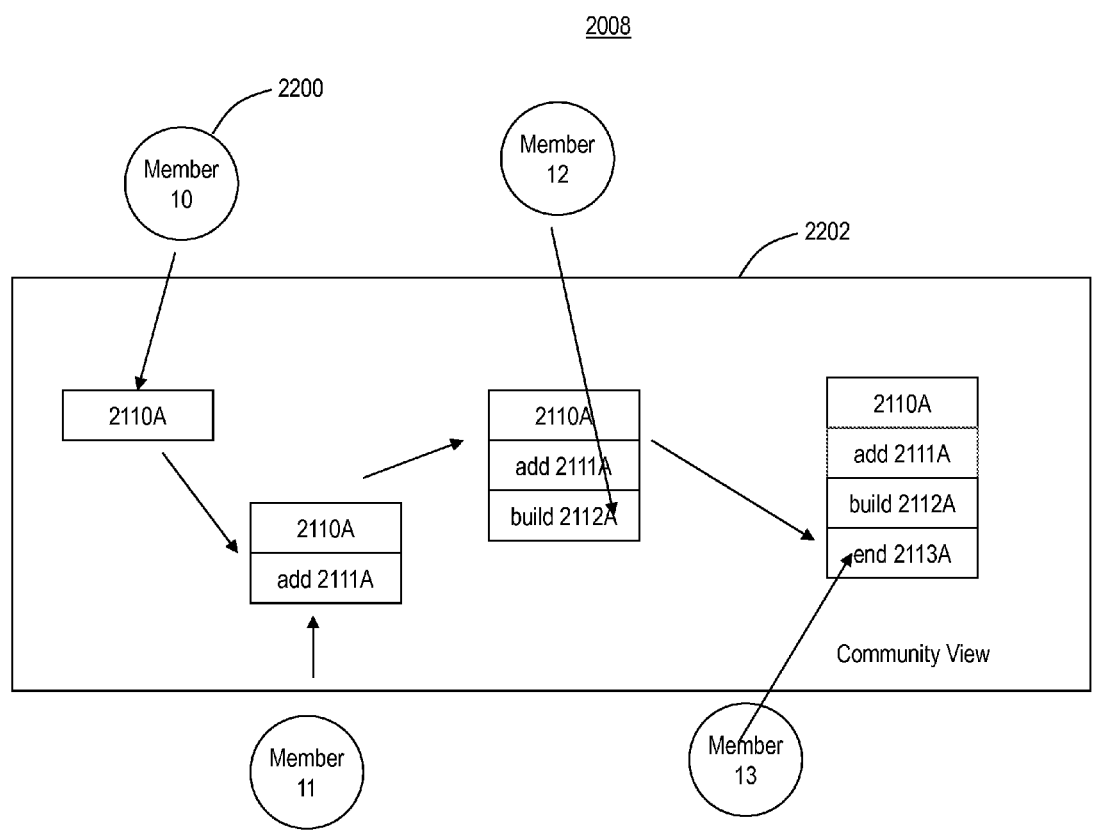
FIG. 18 illustrates the workflow forum where all of the members can see the entire flow in the community view, but only certain of the members can comment on the visual templates at certain times in the flow.

FIG. 18 illustrates the workflow forum 2008 where all of the members 2200 can see the entire flow in the community view 2202, but only certain of the members 2200 can comment on the visual templates 2110 at certain times in the flow. The workflow forum 2008 allows all of the members 2200 to view and comment on a subject as it moves through various different viewpoints, e.g. different departments in a corporation, with the end result being a conversation that has moved in a linear fashion through different groups. This is particularly useful for communities who want to ensure certain key functions have reviewed and commented.

Figure 19:
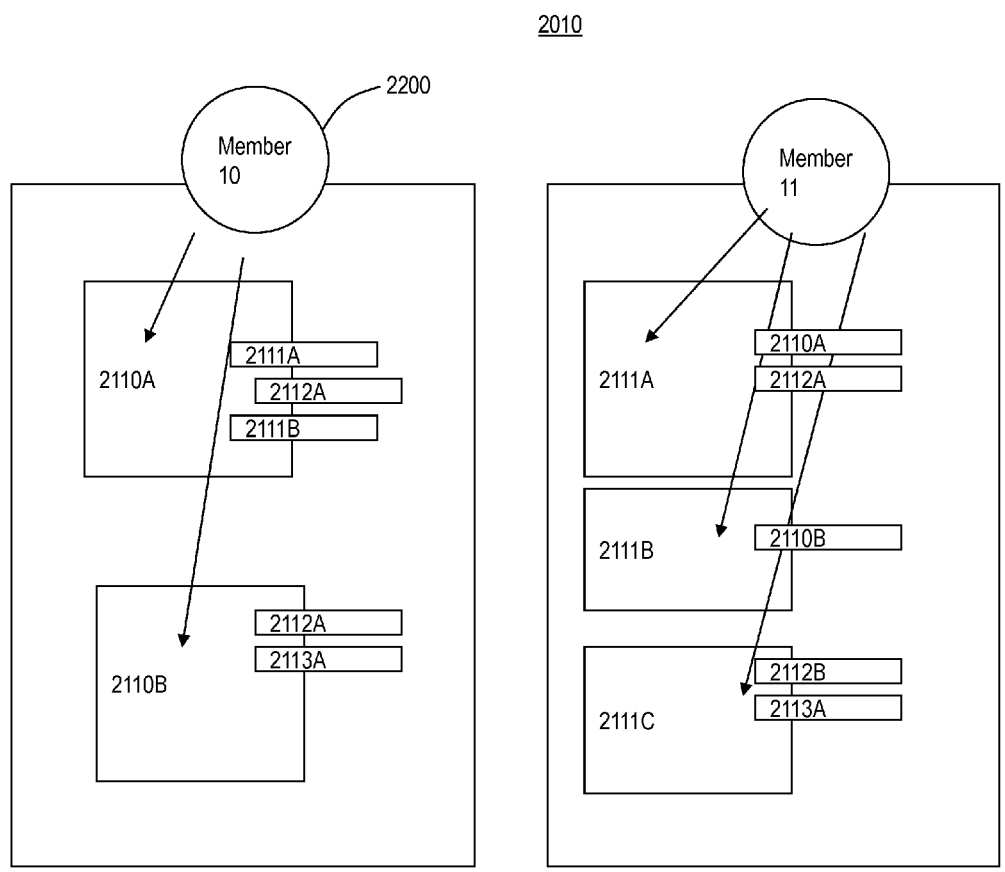
FIG. 19 illustrates the posting style where a specific member creates an ongoing story where other members can insert their visual template comments.

FIG. 19 illustrates the posting style 2010 where a specific member 2200 creates an ongoing story where other members 2200 can insert their visual template 2110 comments. The posting style 2010 allows individual members 2200 to keep a running portrayal of their visual templates 2110 over time, with the ability of other members 2200 to comment with their visual templates 2110 on any part of the running portrayal. This is particularly useful for individuals and groups to share a developing story, activity, thought, etc over time and review how that area changed over time and who had input.

Figure 20:
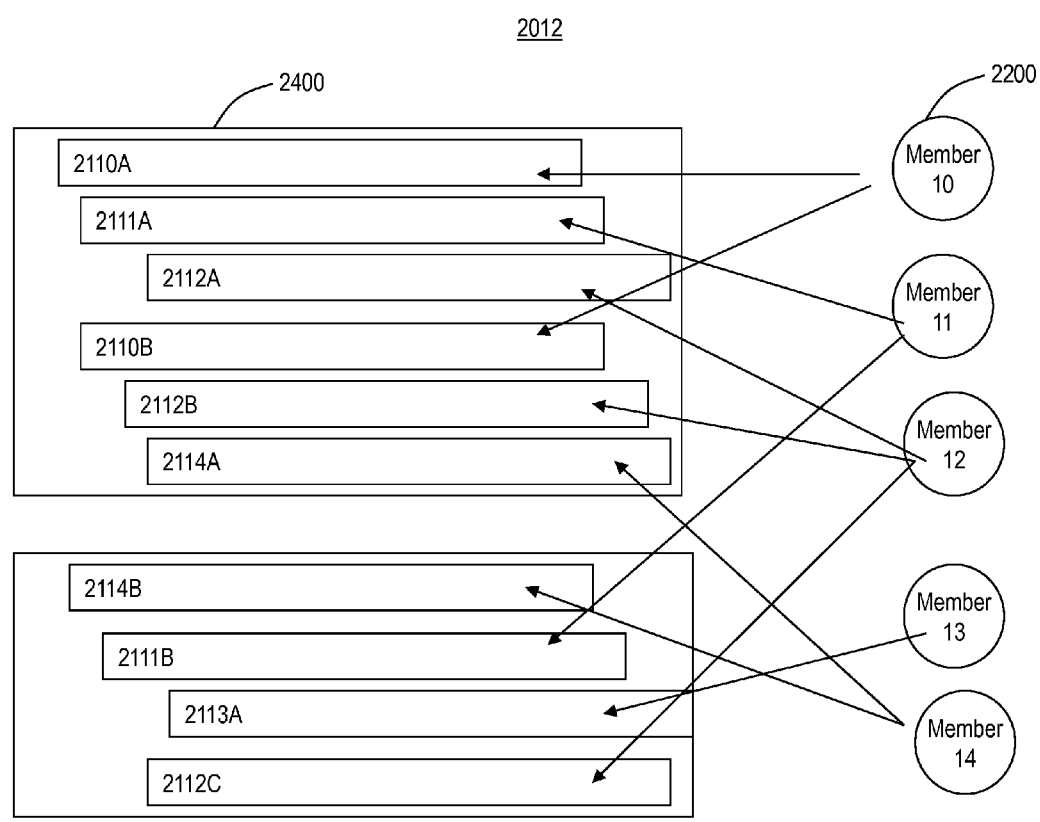
FIG. 20 illustrates the linear style where all of the members can enter the flow of a conversation at any point.

FIG. 20 illustrates the linear style 2012 where all of the members 2200 can enter the flow of a conversation 2400 at any point. The linear style 2012 allows the members 2200 to send messages and respond to messages and show the linear progression of the conversation 2400. This is intended to keep track of basic conversations between a few individual members 2200.

Creating a Community with Profiles and Layered Forum Conversations

In the word dominated world of "I talk, you Listen", the flow of the conversation is already defined, so there is little need when using words to change the conversation style. Using visual templates 2110 as the basis of communication instead of words, the flow of the first conversation and each subsequent conversation among a few members 2200 or all members 2200 can be designed and determined by community leader(s). A community leader will want the flexibility to start a conversation in certain way and have the flow of the conversation evolve into different conversation forums.

Figure 21:
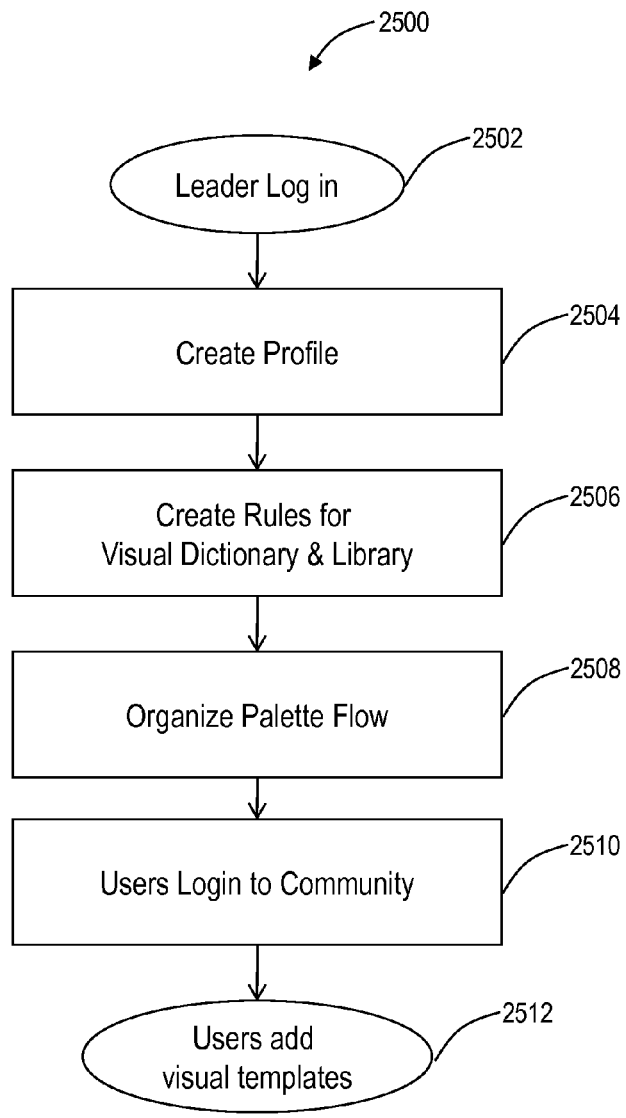
FIG. 21 illustrates a flowchart of an exemplary embodiment for a community leader(s) to build a new community with the desired layered conversations for visual templates.

FIG. 21 illustrates a flowchart of an exemplary embodiment 2500 for a community leader(s) to build a new community with the desired layered conversations for visual templates. As described herein, a community leader, member, etc. is an individual with a device, component, etc. configured to utilize the visual templates via the portal 10 and the like. In the exemplary embodiment 2500, a leader logs into the portal 10 (step 2502) to create a profile allowing individual members to sign up (step 2504), to articulate rules to guide member creation of public and private visual dictionaries and visual libraries (2506), and to organize a conversation flow from a palette (2508). At this point, users, etc. may login through the profile (step 2510), and the users, now members, may participate fully by adding their visual template messages to the forums (step 2512).

Thus, the present disclosure may be utilized for building and managing the layered dialogue of a community using electronic dialogue communication (e.g. via images) amongst a plurality of users. The users may be based on a community definition that includes common binding membership elements. The community leaders may use structures from a palette of forums defining how the flow of dialogue progresses and evolves among users. Users may participate by submitting their visual templates (i.e. sentences, paragraphs, books, etc.) into the dialogue flow.

To initiate a community, leaders select certain membership criteria, certain visual dictionary and visual library rules. The leaders may select from a palette the type of conversations (e.g. circle peer style, an editor style, a topic wall style, a workflow style, a posting style, etc.) and then sequence them in a predetermined flow. Users can enter the entire conversation flow or just parts thereof of their choosing to engage in dialogue.

To initiate or join a conversation, a user first selects the preferred community(ies) they are a member of, and upon entry scans all the conversations, and adds their appropriate template in a conversation, or creates a new conversation directed at members they chose. The user can enter discussion at various points. The user creates their templates from a set of templates already created by the community, or from their private library of templates and completed templates. To insert images into a template, a user selects the images from the community visual dictionary, their own private dictionary, or another public source. Once the user inserts their template into the conversation, they press send and others in the conversation can see the addition. The template can be viewed in multiple conversations. Millions of users can interact real time together with this method.

One use of the system and method is for private individuals in a community to carry on many conversations about what events, issues, projects, activities, etc. are important now and in the future, so a conversations starts with a topic wall type to show all the conversations possible, followed by a circle peer style to focus on a specific area, and finalized with an editor style to reach a publicized consensus. Another use of the system and method is for a business to solve a critical problem, so a conversation starts with the editor style to select the most important problem, followed by a circle peer style to find potential solutions, followed by a work flow style to gain acceptance of certain solutions. Another use of the system is for a group (of friends, of zoologists, etc.) who want to track their day or produce books of common interest, so they start with a posting method to share thoughts, followed by an editor method to finalize the output.

Example

Community Flow for Wide Variety of Subject Matter

FIG. 22 illustrates an exemplary embodiment of selection of several forum styles ordered in a sequence to facilitate individual discussions on a wide range of topics. To create a socially conscious community 1) exposed to certain major issues of the day and 2) capable of creating positive action steps for the community, the community leader may enter the portal and creates a community using the exemplary embodiment 2500. For example, to create the structure of the conversation flow, the leader selects the wall forum 2006 from the palette and uses this as the first conversation flow piece to create and select all issues. Future members can enter this wall forum 2006 in the community and add issues, topics, etc for discussion. Realizing that the community will want to do more than list and view all issues, the leader selects the circle peer style 2002 from the palette and inserts this forum in the community, allowing users to take an issue from the wall forum 2006 and make that issue the center of discussion for a circle peer style 2002, and user can all see the discussion about the issue and contribute as needed. In the circle peer style 2002, the issue is fully explored by interested members from all viewpoints and perspectives. Realizing that certain members may want to take a fully explored issue from the circle peer flow and publicize the "correct" viewpoint, the leader takes the editor forum style 2004 and makes this the last in the layered conversations. So a member selects an issue from the circle peer style 2002 and publishes their editor view in the editor forum style 2004, and the editor receives comments only the editor can see, and the editor publishes to the community only what the editor wants.

Example

Community Flow for Solving Business Problems

Figure 23:
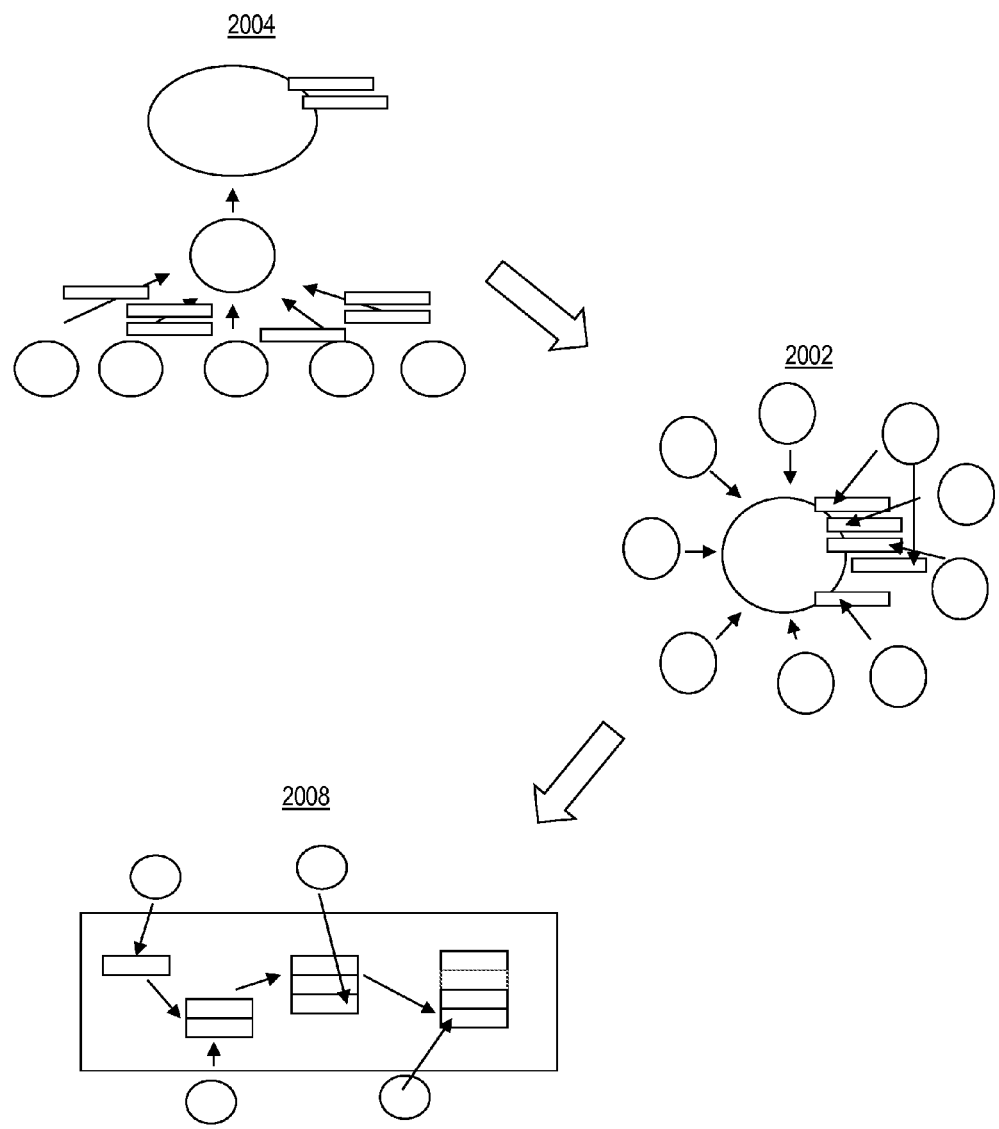
FIG. 23 illustrates an exemplary embodiment of selection of several forum styles ordered in a sequence to facilitate a business group to solve a specific complex problem.

FIG. 23 illustrates an exemplary embodiment of selection of several forum styles ordered in a sequence to facilitate a business group to solve a specific complex problem. To create a business community designed to solve complex business problems, a company leader enters the portal and creates a community using the exemplary embodiment 2500. To create the structure of the conversation flow, the leader selects the editor forum 2004 from the palette and uses this to collect ideas from members on a published public problem the editor is addressing. The editor takes the solution idea and publishes only the ones the editor selects have merit, as judged by the editors' skills and experience. The leader anticipates that the layered conversation should next include a circle peer forum 2002, so the leader takes the forum from the palette and inserts it in the layered conversation. This allows a member to take a published editor visual template from the editor style and make it the central item of the circle peer forum 2002, thus allowing all member to add to and build the core solution. Next the leader anticipates reaching a final consensus on the right solution from each impacted company department perspective, the leader next adds the work flow forum 2008 into the layered conversation. The solution in visual template format enters the work flow forum 2008 and each department in the work flow adds there visual template messages. In this fashion, a company leader created the community using a specific layered conversation flow, and this community is good at solving complex business problems from all perspectives.

Example

Community Flow for Posting Thoughts and Publishing a Result

Figure 24:
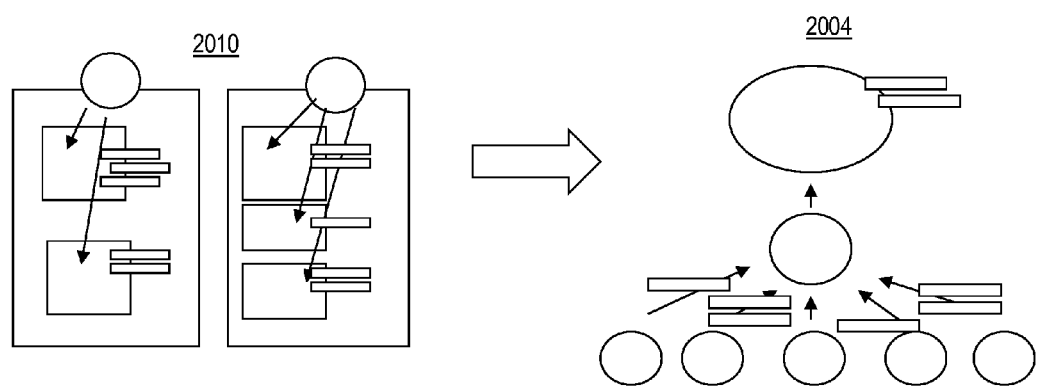
FIG. 24 illustrates an exemplary embodiment of selection of several forum styles ordered in a sequence to facilitate full understanding of a detailed subject.

FIG. 24 illustrates an exemplary embodiment of selection of a couple of forum styles ordered in a sequence to facilitate full understanding of a detailed subject. A leader believes the community members want to express their beliefs as they experience life, so members want to keep a public daily log (or any time increment) of visual templates. So the leader forms a community with the starting layered conversation as a posting style 2010 forum. As the wisdom in the community grows, special experts want to summarize the wisdom, so the leader next adds an editor forum 2004 to the layered conversation so members have the ability to become expert prognosticators.

Content Distribution Systems and Methods

Figure 25:
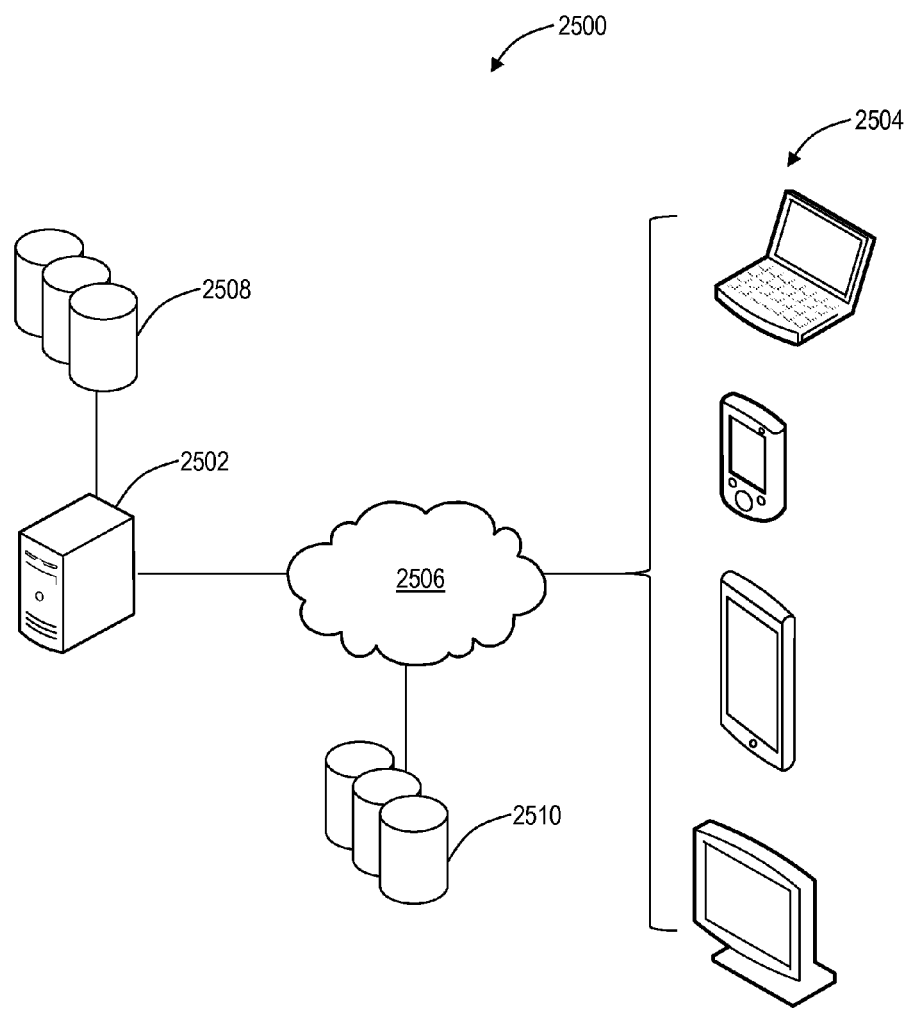
FIG. 25 illustrates a content distribution network for content distribution systems and methods between users via sequences of digital images.

Referring to FIG. 25, in an exemplary embodiment, a content distribution network 2500 is illustrated for content distribution systems and methods between users via sequences of digital images. Note, while described herein as content distribution systems and methods and the content distribution network 2500, these can also be referred to as content delivery. The content distribution network 2500 includes a host server 2502 communicatively coupled to a plurality of users 2504 through a network 2506. The host server 2502 provides a mechanism for the plurality of users 2504 to access content store via data stores 2508, 2510. The host server 2502 can be similar to the server 1200 or variations thereof. The users 2504 can be similar to the mobile device 1300 or variations thereof. Also, the users 2504 can include other types of devices, such as, but not limited to televisions, computers, Internet appliances, content servers, or any type of device configured to interact with content. The data store 2508 can be local with respect to the host server 2502, and the data store 2510 can be remote from the host server 2502 connected via the network 2506. The content distribution systems and methods contemplate either or both implementations. The network 2506 can be the Internet or generally any data communication network for content distribution thereon.

The term content used herein can refer to any type of data received over the content distribution network 2500. Exemplary content can include video, music, text, graphics, web sites, web objects, documents, live streaming media, database results, software, and the like. In exemplary embodiments, the content distribution network 2500 can be a cable television network (CATV), a multiple service offering (MSO) network, a wireless provider network, and the like. The host server 2502 is configured to provide interaction between the users 2504 and the content stored in the data stores 2508, 2510. In an exemplary embodiment, the host server 2502 enables interaction between the users 2504 and the content stored in the data stores 2508, 2510 using the sequences of digital images described herein. The content distribution systems and methods can be viewed as using the aforementioned systems and methods in FIGS. 1-24 for content distribution, selection, viewing, editing, redirecting/repurposing, and the like. That is, the aforementioned images, dictionaries, palette of forms, etc. can be used in conjunction with the host server 2502 and the users 2504 for interaction with the content stored in the data stores 2508, 2510.

Figure 26:
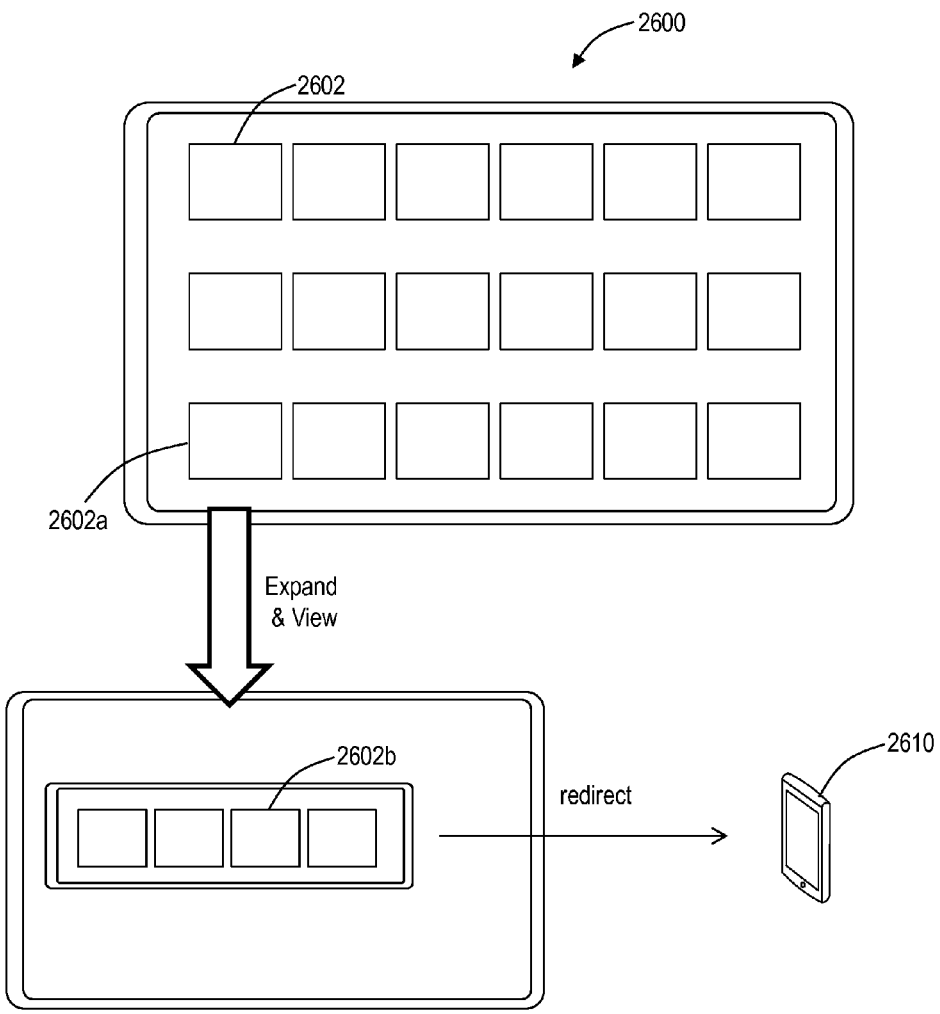
FIG. 26 illustrates a user interface for content distribution systems and methods via sequences of digital images.

Referring to FIG. 26, in an exemplary embodiment, a user interface 2600 is illustrated for content distribution systems and methods via sequences of digital images. With respect to the content distribution network 2500, the user interface 2600 can be associated with one of the users 2504 and their associated device with the user interface 2600. The user interface 2600 is configured to enable user interaction with the content stored in the data stores 2508, 2510 using a plurality of images 2602 displayed thereon. The user interface 2600 can receive the images 2602 from the host server 2502 and interact with the content stored in the data stores 2508, 2510 through the host server 2502. That is, the content distribution systems and methods provide a dialogue between the users 2504 and the content stored in the data stores 2508, 2510 through the host server 2502. This dialogue between the users 2504 and the content uses pictures as the primary mode of dialogue.

As described herein, the images 2602 include one of a plurality of images from a visual dictionary associated with the user 2504 or a general visual dictionary. Each image 2602 can have a direct correspondence with a plurality of words previously associated with the image 2602 such that the image 2602 is configured to convey a message represented by the plurality of words to the user 2504. Each of the images 2602 can include a definition provided by the user such that each of the plurality of images conveys one or more words based on the definition or a general definition.

In an exemplary embodiment, each of the images 2602 is a link or pointer to underlying content, such as content stored in the data stores 2508, 2510. The user interface 2600 is configured to enable an end user to select one of the images 2602 (or multiple images 2602, etc.). This selection can be through a touch screen, a stylus pen, a mouse, a keyboard, a keypad, a pointer, a remote control, and the like. For interaction, the images 2602 allow the end user to select, expand, and view. For example, the user can select a particular image 2602a with the user interface 2600 expanding to show additional images 2602b. The user can select one of the additional images 2602b to be redirected to content 2610. In an exemplary embodiment, each of the images 2602 is a stand-alone image with no corresponding text associated therewith (of course text can be part of the image). Here, the image 2602 alone is used to visually convey a message to the user 2504 of the underlying content. In another exemplary embodiment, each of the images 2602 can include corresponding text for a short description thereof.

Figure 27:
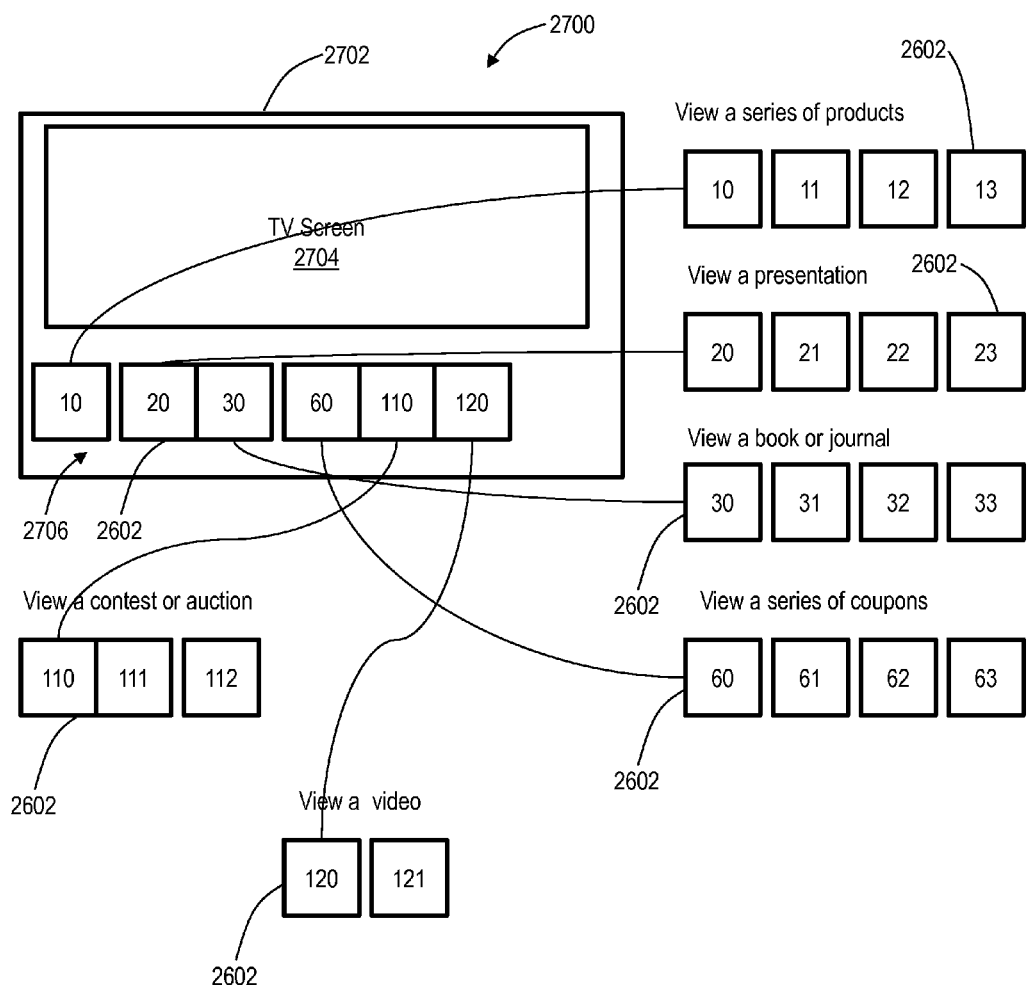
FIG. 27 illustrates a television for utilizing content distribution systems and methods via sequences of digital images in television applications.

Referring to FIG. 27, in an exemplary embodiment, a television 2700 is illustrated for utilizing content distribution systems and methods via sequences of digital images in television applications. The television 2700 can be part of the content distribution network 2500 belonging to one of the users 2504 and being connected to the host server 2502 over the network 2506. In this example, the network 2506 can include the CATV/MSO network, e.g. coax, fiber-to-the-home, etc., a satellite provider, an Internet television provider, etc. Note, while not shown, those of ordinary skill in the art will recognize the television 2700 can be connected to a set top box or equivalent (i.e., a network interface device) for data communications with the host server 2502. The television 2700 includes a display 2702 for displaying content and images 2602 thereon. In an exemplary embodiment, the display 2702 is segmented into two sections—a display screen section 2704 and an image bar 2706 with a plurality of images 2602.

In essence, the television 2700 in the content distribution network 2500 replaces a conventional display with a visual talking system that allows the host server 2502 to send a guide like system to any user 2504 with all the content embedded in the message via links using the images 2602. The television 2700 can show a visual list of all content simultaneously through the images 2602 to view, select, etc. across all digital platforms. A user selects content to explore more, i.e. through clicking, selecting, touching, a remote control, etc. Subsequent to selection, the television 2700 can display all the options to expand, view, watch (like a video), and/or to redirect to a friend or add to your own content and redirect (this could also include a built in licensing system for copyrights assignment, etc).

The images 2602 on the display screen 2702 can enable a user to pull in content from the content distribution network 2500. In the example of FIG. 27, the display screen 2702 includes images 2602-10, 2602-20, 2602-30, 2602-60, 2602-110, 2602-120. Selection of the image 2602-10 can be for the user to view a series of products, for example, denoted by images 2602-10, 2602-11, 2602-12, 2602-13. Selection of the image 2602-20 can be for the user to view a presentation, for example, denoted by images 2602-20, 2602-21, 2602-22, 2602-23. Selection of the image 2602-30 can be for the user to view a book or journal, for example, denoted by images 2602-30, 2602-31, 2602-32, 2602-33. Selection of the image 2602-60 can be for the user to view a series of coupons, for example, denoted by images 2602-60, 2602-61, 2602-62, 2602-63. Selection of the image 2602-110 can be for the user to view a contest or auction, for example, denoted by images 2602-110, 2602-111, 2602-112, 2602-113. Finally, selection of the image 2602-120 can be for the user to watch a video, for example, denoted by images 2602-120, 2602-121. Of course, the foregoing are presented as exemplary embodiments for illustration purposes.

In another exemplary embodiment, the display screen 2702 can be solely filled with the images 2602, similar to the user interface 2600. A plurality of images 2602 can be simultaneously displayed on the display screen 2702, such as for example, fifty images 2702 with each of the images 2602 indicative of a video or channel. The user can, for example, select one of the images 2602 to see a sample of that video or channel, and then, optionally, select the image 2602 again to pay for or watch the video or channel. The user can also freely manipulate the placement, order, etc. of the images 2602 bringing in favorite videos or channels. The user can vote and/or rank videos or channels, and the like.

It is expected that the content distribution systems and methods form a new paradigm for content delivery such as, for example, in cable television, satellite television, etc. The images 2602 can be pointers to the actual content, i.e. the content associated with each image 2602 is underneath the image, overturned upon selection. From the display screen 2702, it is expected the user can select television programs, web videos, magazines, news articles, movies, music, etc. In essence, the images 2602 are abstractions of the associated content in the content distribution network.

Figure 28:
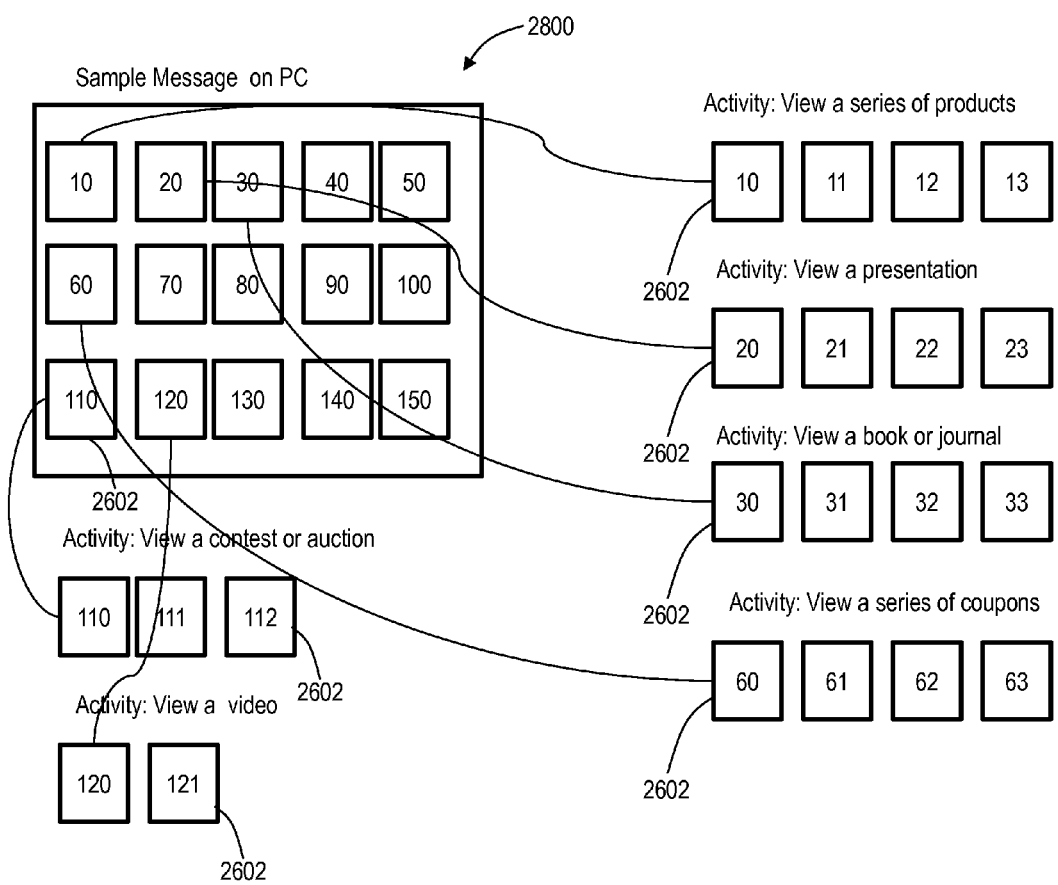
FIG. 28 illustrates a display screen on a computer for utilizing content distribution systems and methods via sequences of digital images.
Figure 29:
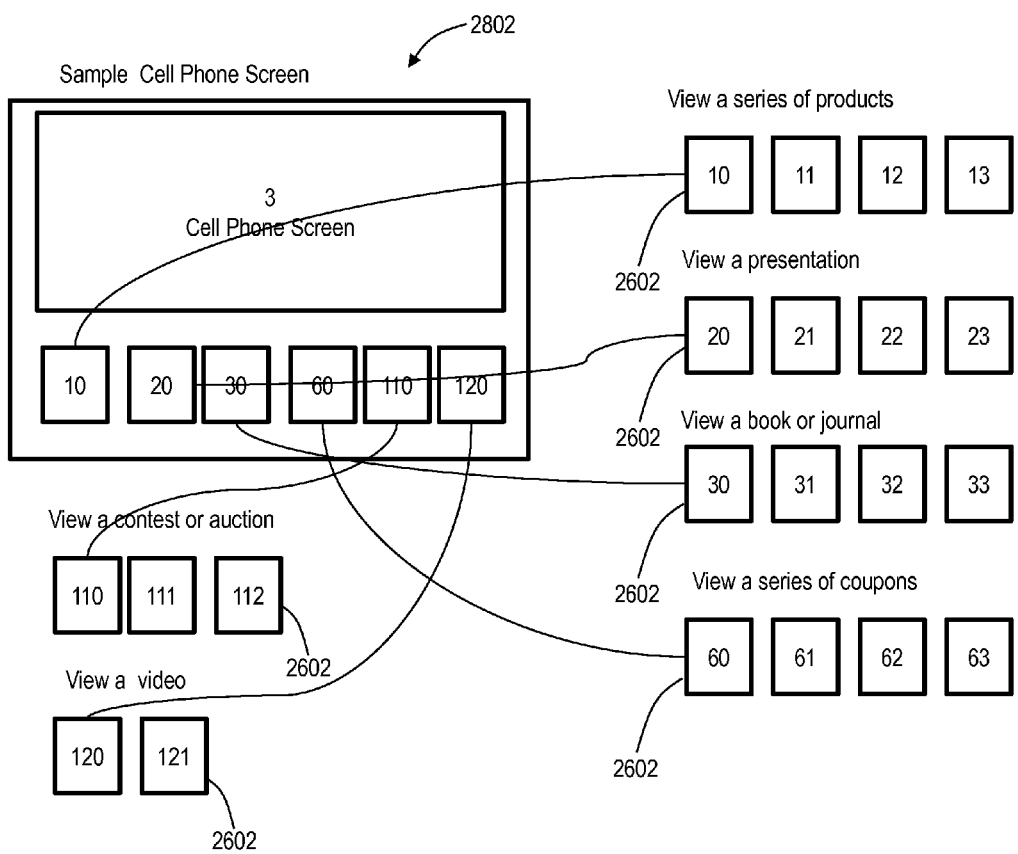
FIG. 29 illustrates a display screen on a mobile device for utilizing content distribution systems and methods via sequences of digital images.

Referring to FIGS. 28 and 29, in exemplary embodiments, display screens 2800, 2802 are illustrated for utilizing content distribution systems and methods via sequences of digital images on a computer and a mobile device. The display screen 2800 can be from a computer, and the display screen 2802 can be from a mobile device (e.g., cell phone) with the computer and the mobile device being associated with users 2504 in the content distribution network 2500. The display screens 2800, 2802 can operate similarly to the display screen 2702 described with respect to the television 2700.

Figure 30:
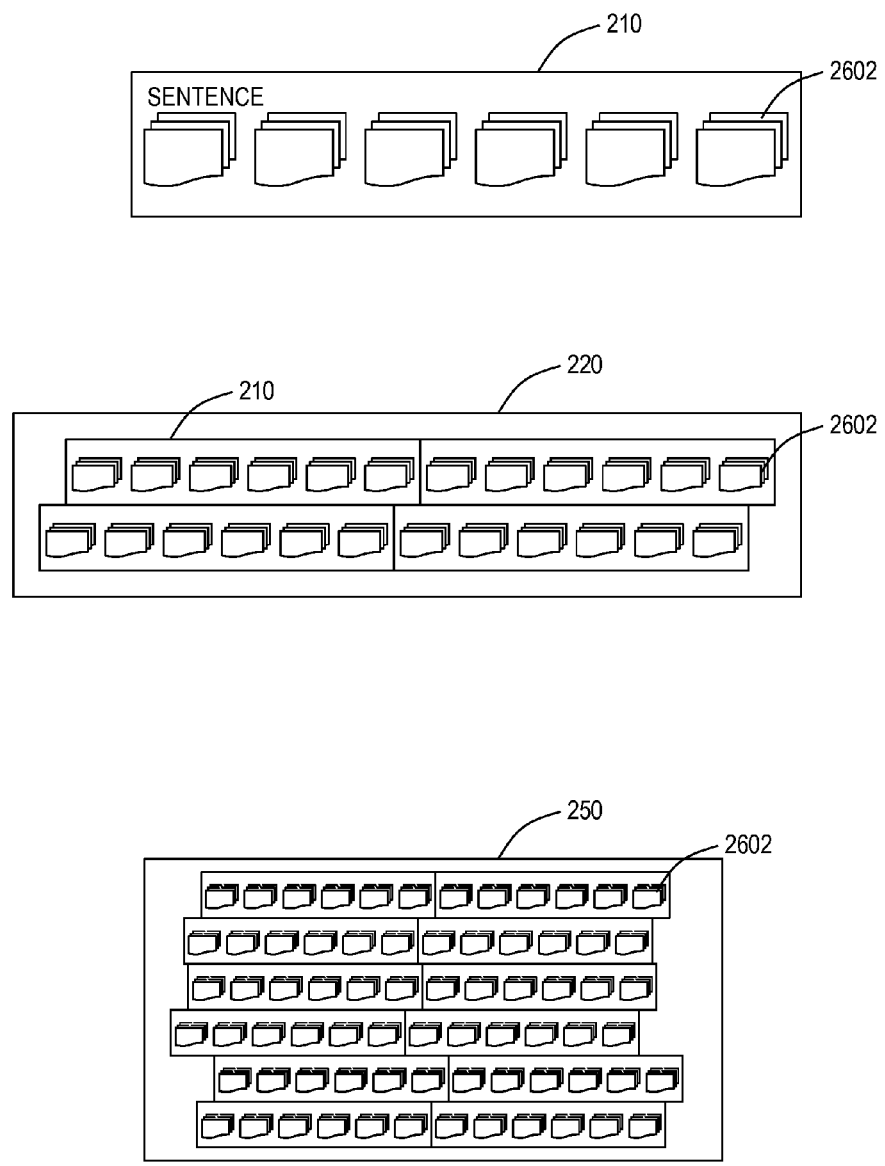
FIG. 30 illustrates exemplary message styles using the images in the content distribution network.

Referring to FIG. 30, in an exemplary embodiment, exemplary message styles 210, 220, 250 are illustrated using the images 2602 in the content distribution network 2500. In particular, FIG. 30 includes aspects described herein in FIG. 9 with a sentence 210 being a sequence of images 2602, a paragraph 220 being a sequence of sentences 210, and a story 250 (or book) being a sequence of paragraphs 220. The sentences 210, paragraphs 220, etc. can be displayed in the content distribution network 2500 such as on the user interface 2600 and the display screens 2700, 2800, 2802. The sentences 210, paragraphs 220, etc. can flow across the screen. Generally, the sentences 210, paragraphs 220, etc. are meant to provide arresting, Captivating, Elegantly Styled Messages (On TV, Smart Phone, PC, or Any Digital Device).

Referring to FIG. 31, in an exemplary embodiment, exemplary images 2602-1-2602-6 are illustrated for display on the user interface 2600 and the display screens 2700, 2800, 2802. For example, the image 2602-1 can be to watch the game tonight and selecting it could create a reminder and/or record the game, or if the game is in progress, bring the game on screen. The image 2602-2 can be to provide a user's opinion of who will win the game. The image 2602-3 can be for a promotion code associated with a sweepstakes. The image 2602-4 can be to provide details to the user for a sale. The image 2602-5 can be to provide details to the user for an auto dealership. Finally, the image 2602-6 can be for the user to buy tickets. Those of ordinary skill in the art will recognize the images 2602 can relate to practically anything. The images 2602 enable more efficient mechanisms to reach users such as relative to banner ads and analytics. The new analytics can include an ability to follow who uses specific images in what type of content along with tracking information (sent where, when, etc.). Current word communication systems do not have a same ability of tracking for analytics. This is an advantage of the systems and methods described herein using sequences of digital images.

Figure 32:
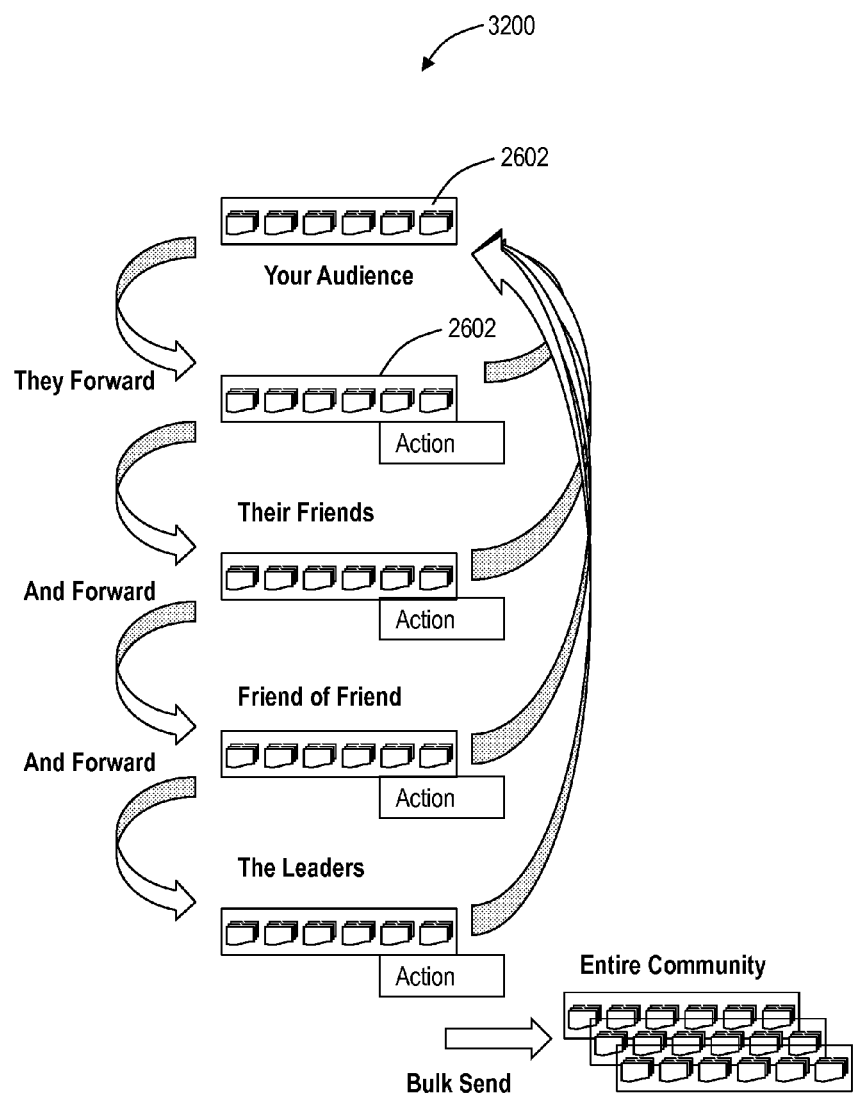
FIG. 32 illustrates a flow diagram of interactive visual messages over the content distribution network.

Referring to FIG. 32, in an exemplary embodiment, a flow diagram illustrates interactive visual messages 3200 over the content distribution network 2500. The visual messages 3200 provide interactive messages anywhere, everywhere at anytime to any digital device. In this example, the visual messages 3200 are in a cascaded format, i.e. the messages cascade forming a cascading communication system. First, the messages 3200 are delivered to an intended audience. This can be from the host server 2502 to intended users 2504. It is expected that the receiving users 2504 will forward with appropriate actions, there forwarded users 2504 will forward with appropriate actions, etc. There can be bulk sending of the messages 3200 to an entire community, etc. Further, the host server 2502 can monitor the movement of the messages 3200 and the actions associated therewith. Also, each user 2504 can provide their own content, i.e. organize content and distribute it to other users 2504. Again, the content can include analytics as described herein.

Figure 33:
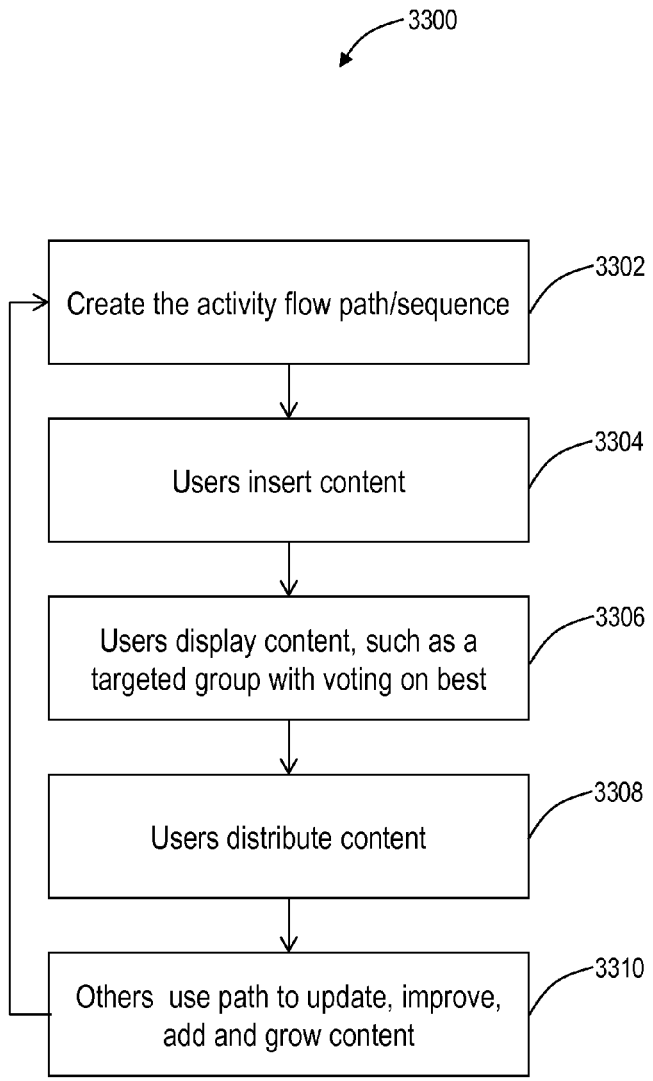
FIG. 33 illustrates a flowchart of a method for building an activity flow of content, distributing it, and adapting it.

Referring to FIG. 33, in an exemplary embodiment, a flowchart illustrates a method 3300 for building an activity flow of content, distributing it, and adapting it. In an exemplary embodiment, the method 3300 can use the content distribution network 2500 being operated by the users 2504 and distributed therebetween. The activity flow of content can be the images 2602 and the underlying content associated therewith. In the following, the method 3300 is described with reference to examples related to a book (e.g., a bible story). First, an activity flow path/sequence is created (step 3302). This can include, for the book, selecting a bible verse and leaving blank spots for users to insert the images 2602 related thereto. Users then insert content (step 3304). Here, the users can insert pictures for the images 2602 to tell the story of the bible verse. Next, the users can display the selected content with certain users or a targeted group voting on the best content (step 3306). The elected content can be distributed (step 3308). For example, the content can be distributed to interested audiences, e.g. those who buy religious books. Finally, Others use the path to update, improve, add and grow content in a collaborative, recursive, and crowd sourced format (step 3310).

The method 3300 can be used for "Activity managed flow" using the sequential digital images. This can be done in a variety of applications with users crowd sourcing development of projects. For example, this can be done with respect to games, building a video or visual story, building a manual, etc. Generally, the sequential digital images described herein can be used for content distribution as well as for content creation, i.e. in building and managing activities such as described herein relative to the method 3300. Generally, the method 3300 and variants thereof can be viewed as crowd sourcing where plural users work together to provide content items. This can be seen as the opposite of Twitter, Facebook, etc. where individual users publish content for viewing by plural users. Here, the users work together to form the content akin to a swarm of bees coming in, putting their thoughts into content, and allowing the group of users to select the best.

Referring to FIGS. 34-36, in exemplary embodiments, diagrams and a table illustrate unique skin analytic systems and methods for managing a user's own visual content. This management can be coupled with the sequential digital image systems and methods variously described herein or separately. Conventionally, with millions of "pictures" of the same thing, and millions more growing each day, using word/number tags to identify pictures and related content (e.g., videos, visual sentence & books, etc.) will not fully solve the identification problem, that is who owns what, how it was used, what sequence it went through (i.e., evolution derivations, etc.). Thus, unique skin analytic systems and methods can be used such that all visual content (or any other digital content) includes an added "skin" that envelopes all of the content, in either a visual or hidden manner. Importantly, the skin follows the flow of the content as it evolves, is derived, etc. The skins can be layered on top of each content such that as additions are made, by a new user, another skin is added in addition to the first skin (or any previous skins). Thus, skins can presumably be added until infinity. The skins can be followed by their user anywhere. Coupled with this marking of visual content with skins, skin analytics can show usage, timing, sequencing, and follow the flow of use in all forms of digital communication (PC, mobile devices, TV, tablet pads, etc.).

FIGS. 34-35 include multiple unique skins 3400A-3400I with a unique skin 3400 for each user. In these exemplary embodiments, the skins 3400 are depicted as different shapes, i.e. a different shape for each user. The image owner or originator places a corresponding skin 3400 on content. For example, the user associated with skin 3400A can own or create an image 3402 and embed the skin 3400A thereon or therein. In another example, the user associated with skin 3400E can take the image 3402 and embed their skin 3400E in addition to the skin 3400A on the image 3402 in a manner tracking the use, ownership, etc. of the image 3402. The user associated with skin 3400A can also own or create a sentence/template 3404 and embed the skin 3400A thereon or therein. The sentence/template 3404 can use the image 3402 with both the skins 3400A, 3400E and another image 3406 with a skin 3400E. Even further, the user associated with the skin 3400H can create another sentence/template 3408 made up of the images 3402, 3406 with their respective skins 3400 and other images. Note, while the skin 3400 is illustrated as a geometric shape, those of ordinary skill in the art will recognize it can be anything embedded in or on the image 3402 to uniquely identify the owner of the image 3402. This can include, but is not limited to, watermarking, steganography, distinguishing patterns added to the image 3402, labels or the like added to the image 3402, portrait frames on or around the image 3402, and the like. Further, as noted in the sentence/templates 3404, 3406, the skins 3400 can be embedded upon other skins 3400. Additionally, FIG. 35 illustrates the use of images with the skins 3400 in paragraphs 3502, 3504.

FIG. 36 illustrates a table 3600 that can be used to track the skins 3400 and their associated usage. The skins 3400 enable tracking of the images 3402, 3406 and their use in a visual talking context (or in any use). Advantageously, the skins 3400 are easier to use and less complex than a word-based metadata system. That is, the skins 3400 are embedded in, on, etc. the image, not extra metadata attached to the image file. Thus, when passed around, images do not need to take metadata with them, but rather the skins 3400 travel in or on the image. Metadata can still be maintained, but in the present invention, the metadata can remain with the owner of the image, and is not required to travel with the image. The skins 3400 are also better than other conventional tracking methods, such as cookies, in that they do not enable spying or tracking of users. Rather, the skins 3400 track the use of the images. The image owner can gets the analytics and it could be up to the skin owner as to whether to share this data. The table 3600 illustrates one exemplary analytics system/method using the skins 3400. For example, the table 3600 tracks items in the visual talking systems and methods described herein, i.e. images, sentences, books, templates, sequences, etc. Each of these items include sequenced digital images for conveying messages in lieu of words, i.e. "visual talking." Using the skins 3400, the user can track how many times an item is seen, used, by whom, etc. This also can be used to implement a copyright and/or royalty system for licensing, etc.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A content distribution system, comprising:
   a host server communicatively coupled to at least one data store;
   at least one user; and
   a network communicatively coupling the at least one user to the host server and the content;
   wherein the host server comprises instructions executable by a processor therein, and in response to such execution causes the host server to:
      provide sequence of digital images to the at least one user, wherein each of the digital images indicative of content in the at least one data store;
      responsive to a selection of one of the digital images, distribute the content to the at least one user;
      manage a library of images for the at least one user, wherein the library comprises a plurality of images for the at least one user to select therefrom to provide the sequence of digital images; and
      embed a skin on a new image for the at least one user, wherein the skin provides tracking and analytics of the new image and associated use in content of the content distribution system.

2. The content distribution system of claim 1, further comprising:
   a plurality of users comprising the at least one user communicatively coupled to the host server;
   wherein, in response to execution of the instructions, the instruction further cause the host server to:
   enable the plurality of users to select, view, edit, and redirect the content thereby performing crowd sourcing of the content.

3. The content distribution system of claim 1, wherein the network comprises any of a cable television network, a wireless network, and a wireless television network.

4. The content distribution system of claim 3, wherein the at least one user comprises:
   a network interface device communicatively coupled to the host server; and
   a device communicatively coupled to the network interface device.

5. The content distribution system of claim 4, wherein, in response to execution of the instructions, the instruction further cause the host server:
   display the sequence of digital images on the device; and
   providing a click through action based on the at least one user selecting one or more of the sequence of digital images.

6. The content distribution system of claim 4, wherein, in response to execution of the instructions, the instruction further cause the host server:
   display the sequence of digital images on the device in addition to displaying the content on the device.

7. The content distribution system of claim 1, wherein, in response to execution of the instructions, the instruction further cause the host server to:
   update and provide analytics to the at least one user for the new image and any other images with the skin embedded thereon.

8. A host server in a content distribution network, comprising:
   a data store storing a plurality of words and corresponding images in a local visual dictionary;
   a network interface communicatively coupling the host server to a network;
   a processor communicatively coupled to the data store and the network interface; and
   instructions executable by the processor, and in response to such execution causes the processor to:
      provide sequence of digital images to at least one user, wherein each of the digital images indicative of content; and
      responsive to a selection of one of the digital images, distribute the content to the at least one user;
      manage a library of images for the at least one user, wherein the library comprises a plurality of images for the at least one user to select therefrom to provide the sequence of digital images; and
      embed a skin on a new image for the at least one user, wherein the skin provides tracking and analytics of the new image and associated use in content of the content distribution system.

9. The host server of claim 8, wherein, in response to execution of the instructions, the instruction further cause the processor to:
   enable the at least one user to select, view, edit, and redirect the content.

10. The host server of claim 8, wherein the network comprises any of a cable television network, a wireless network, and a wireless television network.

11. The host server of claim 9, wherein the at least one user comprises:
   a network interface device communicatively coupled to the host server; and
   a device communicatively coupled to the network interface device.

12. The host server of claim 9, wherein, in response to execution of the instructions, the instruction further cause the processor to:
   display the sequence of digital images on the device.

13. The host server of claim 9, wherein, in response to execution of the instructions, the instruction further cause the processor to:
   display the sequence of digital images on the device in addition to displaying the content on the television.

14. The host server of claim 8, wherein, in response to execution of the instructions, the instruction further cause the processor to:
   update and provide analytics to the at least one user for the new image and any other images with the skin embedded thereon.

15. A content distribution method, comprising:
   communicating content to at least one user over a content distribution network;
   including sequenced images in the content, wherein each of the sequenced images have a direct correspondence with a plurality of words previously associated with each of the sequenced images such that each of the sequenced images is configured to convey a message represented by the plurality of words to the at least one user;
   enabling distribution of the content responsive to the at least one user's interaction with the sequenced images; and
   tracking the sequenced images based on skins embedded thereon.

* * * * *